MULTIPLE COMPUTER-MULTIPLE MEMORY SYSTEM

Filed Dec. 30, 1963 10 Sheets-Sheet 1

INVENTORS
LESTER S. HECHT
THEODORE M. HERTZ
BY A. M. Fernandez
ATTORNEY

INVENTORS
LESTER S. HECHT
THEORORE M. HERTZ
BY
ATTORNEY

May 30, 1967 L. S. HECHT ETAL 3,323,109

MULTIPLE COMPUTER-MULTIPLE MEMORY SYSTEM

Filed Dec. 30, 1963 10 Sheets-Sheet 3

INVENTORS
LESTER S. HECHT
THEODORE M. HERTZ

BY *A. M. Fernandez*

ATTORNEY

INVENTORS
LESTER S. HECHT
THEODORE M. HERTZ
BY
A. M. Fernandez
ATTORNEY

| SIGN | OPERATION CODE | | CHANNEL ADDRESS | | SECTOR ADDRESS | | FLAG | SYNCH BIT |
|---|---|---|---|---|---|---|---|---|
| 41 | 40 39 38 | 37 36 35 | 34 33 32 | 31 30 29 | 28 27 26 | 25 24 23 | 22 | |
| 21 | 20 19 18 | 17 16 15 | 14 13 12 | 11 10 9 | 8 7 6 | 5 4 3 | 2 | 1 |

| OPERATION MNEMONIC | CODE OCTAL | D REGISTER 6 5 4 3 2 1 | C REGISTER 6 5 4 3 2 1 | Xs REGISTER 6 5 4 3 2 1 |
|---|---|---|---|---|
| S T R | 0 5 | 0 0 0 1 0 1 | | |
| S T O | 4 5 | 1 0 0 1 0 1 | | |
| C L A | 3 7 | 0 1 1 1 1 1 | | |
| C T B | 6 0 | 1 1 0 0 0 0 | | |
| C F B | 6 4 | 1 1 0 1 0 0 | | |

INVENTORS
LESTER S. HECHT
THEODORE M. HERTZ
BY
A. M. Fernandez
ATTORNEY

INVENTORS
LESTER S. HECHT
THEODORE M. HERTZ
BY
A. M. Fernandez
ATTORNEY

May 30, 1967 L. S. HECHT ETAL 3,323,109

MULTIPLE COMPUTER-MULTIPLE MEMORY SYSTEM

Filed Dec. 30, 1963 10 Sheets-Sheet 7

INVENTORS
LESTER S. HECHT
THEODORE M. HERTZ
BY
A. M. Fernandez
ATTORNEY

INVENTORS
LESTER S. HECHT
THEODORE M. HERTZ
BY
A. M. Fernandez
ATTORNEY

| Bit Location | DIGIT COUNTER ("P" FLIP FLOPS) | | | | | | SPECIAL DIGIT TIMES Indicated by Primary "AND" Gates and T1 and T41 FFs |
|---|---|---|---|---|---|---|---|
| | P6 | P5 | P4 | P3 | P2 | P1 | |
| 1 | 0 | 0 | 0 | 0 | 0 | 0 | 1t1 = T41P6   ot1 = T1 (Flip Flop,T1) |
| 2 | 0 | 0 | 0 | 0 | 0 | 1 | P6'P5'P3'P2'P1 |
| 3 | 0 | 0 | 0 | 0 | 1 | 0 | |
| 4 | 0 | 0 | 0 | 1 | 0 | 1 | |
| 5 | 0 | 0 | 1 | 0 | 1 | 0 | |
| 6 | 0 | 1 | 0 | 1 | 0 | 1 | |
| 7 | 0 | 0 | 1 | 0 | 1 | 1 | |
| 8 | 0 | 1 | 0 | 1 | 1 | 0 | P6'T8 |
| 9 | 0 | 0 | 1 | 1 | 0 | 0 | |
| 10 | 0 | 1 | 1 | 0 | 0 | 1 | |
| 11 | 0 | 1 | 0 | 0 | 1 | 1 | |
| 12 | 0 | 0 | 0 | 1 | 1 | 1 | |
| 13 | 0 | 0 | 1 | 1 | 1 | 0 | P6'P4'T13 |
| 14 | 0 | 1 | 1 | 1 | 0 | 1 | P6T14P2'P1 |
| 15 | 0 | 1 | 1 | 0 | 1 | 1 | |
| 16 | 0 | 1 | 0 | 1 | 1 | 1 | |
| 17 | 0 | 0 | 1 | 1 | 1 | 1 | |
| 18 | 0 | 1 | 1 | 1 | 1 | 0 | P6'P2P1'T14 |
| 19 | 0 | 1 | 1 | 1 | 0 | 0 | P6'P2'P1'T14 |
| 20 | 0 | 1 | 1 | 0 | 0 | 0 | P6'T20 |
| 21 | 0 | 1 | 0 | 0 | 0 | 0 | T41'P5P4'P3'P2' |
| 22 | 1 | 0 | 0 | 0 | 0 | 1 | P6P5'P3'P2'P1 |
| 23 | 1 | 0 | 0 | 0 | 1 | 0 | |
| 24 | 1 | 0 | 0 | 1 | 0 | 1 | |
| 25 | 1 | 0 | 1 | 0 | 1 | 0 | |
| 26 | 1 | 1 | 0 | 1 | 0 | 1 | |
| 27 | 1 | 0 | 1 | 0 | 1 | 1 | |
| 28 | 1 | 1 | 0 | 1 | 1 | 0 | P6T8 |
| 29 | 1 | 0 | 1 | 1 | 0 | 0 | |
| 30 | 1 | 1 | 1 | 0 | 0 | 1 | |
| 31 | 1 | 1 | 0 | 0 | 1 | 1 | |
| 32 | 1 | 0 | 0 | 1 | 1 | 1 | |
| 33 | 1 | 0 | 1 | 1 | 1 | 0 | P6T13 |
| 34 | 1 | 1 | 1 | 1 | 0 | 1 | P6P2'P1T14 |
| 35 | 1 | 1 | 1 | 0 | 1 | 1 | |
| 36 | 1 | 1 | 0 | 1 | 1 | 1 | |
| 37 | 1 | 0 | 1 | 1 | 1 | 1 | |
| 38 | 1 | 1 | 1 | 1 | 1 | 0 | P6P2P1'T14 |
| 39 | 1 | 1 | 1 | 1 | 0 | 0 | P6P2'P1'T14 |
| 40 | 1 | 1 | 1 | 0 | 0 | 0 | P6T20 |
| 41 | 1 | 1 | 0 | 0 | 0 | 0 | T41 1t41 = T40+S1IqI2 ot41 = T41 (Flip Flop,T41) |

LOGIC FOR SETTING "P" FLIP FLOPS

P1
1p1 = P5'P1'T41'* + T21
op1 = P5'P1 + T41

P2
1p2 = P1T41'*
op2 = P1' + T41

P3
1p3 = P2T41'*
op3 = P2' + T41

P4
1p4 = P3T41'*
op4 = P3' + T41

P5
1p5 = P4T41'*
op5 = P4' + T41

P6
1p6 = T21
op6 = T41

* T41' insures that the FF will not be hit on both inputs.

T13 = P5'P3P2P1' (T13,33)
T14 = P5P4P3 (T14,18,19,34,38,39)
T20 = P5P4P3'P1' (T20,T40)
T8 = P4'P3P1'Ka' (T8,T28)

FIG. 10

INVENTORS
LESTER S. HECHT
THEODORE M. HERTZ
BY
A. M. Fernandez
ATTORNEY

INVENTORS
LESTER S. HECHT
THEODORE M. HERTZ
BY
ATTORNEY

United States Patent Office 3,323,109

Patented May 30, 1967

3,323,109
MULTIPLE COMPUTER-MULTIPLE MEMORY SYSTEM

Lester S. Hecht, Santa Ana, and Theodore M. Hertz, Whittier, Calif., assignors to North American Aviation, Inc.

Filed Dec. 30, 1963, Ser. No. 334,346
3 Claims. (Cl. 340—172.5)

This invention relates to a multiple computer data processing system, and more particularly to the integration of computers with a plurality of auxiliary units in a data processing system in such a manner as to provide communications between computers, and between any computer and auxiliary unit, including block transfer of data between an auxiliary unit and a computer.

In large data processing applications, it is often desirable to integrate two or more systems for either greater data processing capability or greater data storage capacity. The latter has been the most frequent, but the increasing demand for larger and more flexible data processing capabilities has created a need for the integration of a plurality of computers with auxiliary units in a system, such as for military command and control applications. If the resulting integrated system comprises computers and auxiliary units having dissimilar types of memories, such as a serial recirculating-type memory in the computer and a parallel, random-access type memory in the auxiliary unit, direct access or transfer of data to the memory in the auxiliary unit by the computer becomes a problem.

For an ideal integration of a computer and auxiliary unit, the computer should be capable of addressing directly the memory of either the computer or the auxiliary unit. The direct approach of providing sufficient binary digits in the address portion of an instruction to address either memory has the advantage of simplicity in logical design, but such an approach would be too extravagant in the utilization of information bits in the instruction. A more difficult but more efficient approach would be to provide the capability of reading all of one memory in the usual manner, and for selectively reading at least a portion of the other memory by effectively substituting that portion for a portion of the one memory, said portions constituting blocks of memory locations having corresponding addresses. In that manner data may be transferred between a computer and an auxiliary unit, either one word at a time or in blocks.

Therefore, an object of the present invention is to provide a multiple computer data processing system.

Another object is to provide an improved system for transferring data between a computer and an auxiliary unit.

Still another object is to provide a system for direct access to a memory in any one of a plurality of auxiliary units by any one of a plurality of computers.

Yet another object is to provide economical communication between computers in a multiple computer system.

Another object is to provide an improved system for transfer of data in blocks between a computer having a recirculating-type memory and an auxiliary unit having a random-access-type memory.

These and other objects are achieved in an illustrative embodiment of the invention in a multiple computer system having a plurality of computers and a plurality of auxiliary units, one unit for each computer. A control network integrates the computers and auxiliary units into a system such that data can be transferred between the computers having disc or other recirculating-type memory and the auxiliary units having core or other type of random-access memory in two ways. The first way is by block transfer between any computer and an associated one of the auxiliary units, and the second way is by selective, one-word transfer between any computer and any auxiliary unit. The one-word-transfer operation not only provides greater flexibility but also enables any computer to communicate with another in an efficient manner. The message to be communicated is first placed in a predetermined memory location of one of the auxiliary units by the transmitting computer; then the receiving computer is interrupted under the control of a stored program in the transmitting computer to cause the receiving computer to branch from its program in process to a subroutine which causes it to address the predetermined memory location, thereby reading the message.

The auxiliary units each have a core memory with at least one block or channel of memory locations consecutively addressed by the consecutive address codes of a different disc memory channel of its associated computer. In an illustrative embodiment, a computer word consists of 40 binary digits which may be stored in consecutive cells of a memory location or sector in a track or channel of a disc memory. In the auxiliary units, on the other hand, a 40-bit word is read in and out eight bits at a time in parallel. Thus, each 40-bit word may be transferred between a computer and an auxiliary unit eight bits at a time, each group of eight bits constituting a character. An 8-bit input-output register is provided for that purpose.

For a block transfer operation, either to or from an associated auxiliary unit, any channel in the disc memory of the computer may be employed with the pre-determined channel of its associated auxiliary unit. For one word transfer operations, any one of the computers can address any location of any one of the auxiliary units by simply specifying the channel address of the auxiliary unit to be addressed. Thus each auxiliary unit channel which may be addressed by a computer bears an address which corresponds to a different one of the channels which may be found in each of the computers.

The translation of a channel address into auxiliary-unit selecting signals is accomplished by a logic network which provides not only a priority control but also a busy signal once access to an auxiliary unit is obtained by one of the computers so that the same channel will not be addressed by more than one computer at any given time. First priority to a particular auxiliary unit is given to its associated computer; the remaining orders of priority are arbitrarily established.

The disc memory channels in the computers which correspond to predetermined channels in the auxiliary units are not addressed directly by the computer except for block transfer operations since the octal codes specifying those channels are reserved for addressing the auxiliary units. In other words, the computer automatically translates the octal codes identifying the channels of the auxiliary units into auxiliary-unit-selecting signals. However, individual memory locations in those channels of each computer may be addressed by indexed instructions, i.e., by instructions which initially address memory locations in other channels, so that auxiliary-unit-selecting signals are not generated, and after having some number arithmetically added to the channel-code portion of the instruction, finally addresses a memory location in one of those channels.

Other objects and advantages of the invention will become apparent from the following detailed description with reference to the drawings in which:

FIG. 10 is a chart illustrating the operation of a 6-bit P counter employed to establish digit synchronizing signals within a 40-bit word-time.

It should be noted that in the broadest aspects of the invention, the computers may be of any general-purpose type but that a disc or drum-memory type is preferred because computers of that type are generally less expensive and therefore more suitable as modules in a multiple computer system. The sacrifice of speed for economy in the computers is more than offset by the expanded capacity and capability of the system afforded by the auxiliary units, each of which may be a separate data processing system or computer having a random access memory channel such as a high-speed or scratch-pad core memory.

In the following description, the computer selected to illustrate an embodiment of the invention is of the magnetic-disc-memory type, and more particularly of the type disclosed by T. M. Hertz in an application Ser. No. 187,-319, filed Apr. 13, 1962, and assigned to the assignee of this application. The logical description of the computer is set forth in complete detail in that copending application; therefore, only so much of that computer necessary to understand this invention will be described in the following logical description.

For simplicity, the auxiliary units are described hereinafter as having standard or commercial core memory units although, as just noted, they may have any random-access type of memory. In the illustrative embodiment, binary digits are stored and read in parallel eight bits at a time whereas the computer utilizes 40-bit words. Accordingly, the logic network employed to address the auxiliary unit memories from the computers is arranged to read five consecutive 8-bit characters to compose one computer word. Thus, as will be more fully understood from the following detailed description, five characters of eight bits comprise one word for a transfer operation to or from a computer; consequently, the cores from which the five characters are read are considered collectively as a single memory location. Other character lengths could obviously be provided for, such as a 40-bit character in which case the logic network may be readily simplified.

*System organization*

Figure 1:
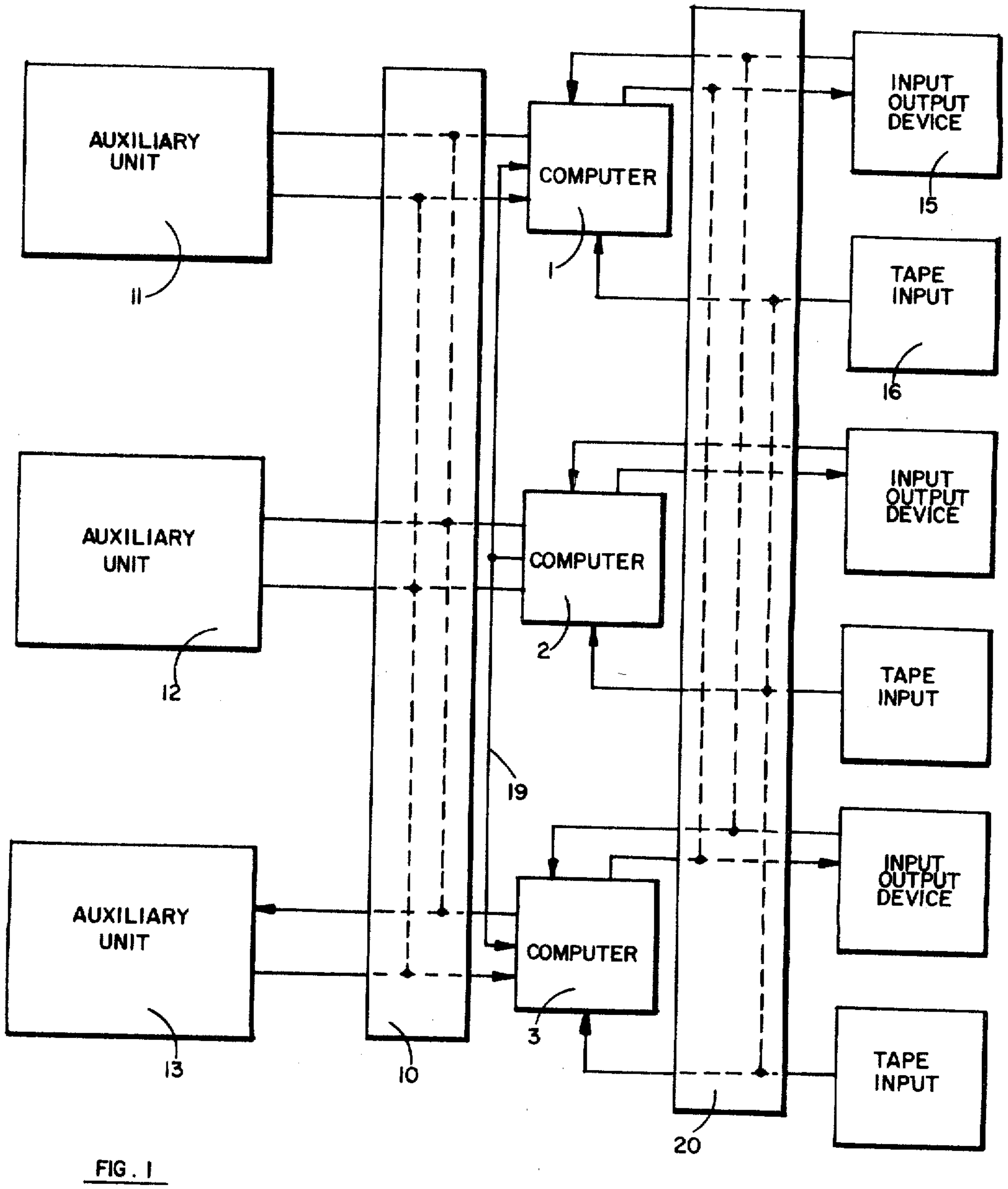
FIG. 1 is a simplified block diagram of a multiple computer system embodying the principles of the present invention.

Referring now to FIG. 1, an illustrative multiple computer system is shown as comprising three computers 1, 2 and 3, each associated through a logic network 10 with a respective one of three auxiliary units 11, 12 and 13. Each computer is also associated with a group of peripheral devices, such as an input-output device 15 and a tape input device 16, through a logic network 20 that enables any computer to select any peripheral device for an input or output operation. The network 20 is not a part of this invention and will therefore not be described beyond pointing out that any computer may address any device through the logic network 20. As will be described more fully with reference to FIG. 2, each computer is given priority over its associated auxiliary unit and over the other units in accordance with the following table.

| Computer: | Order of Priority |
|---|---|
| **1** | **11, 12, 13** |
| **2** | **12, 11, 13** |
| **3** | **13, 11, 12** |

Information can be transferred between computers and auxiliary units by two general methods, one-word transfers and block transfers. Block transfer is provided for communication between each computer and its auxiliary unit only; however, the logic network 10 obviously may be expanded to provide block transfer between each computer and any of the auxiliary units by using the same logic design techniques to be described hereinafter with reference to the drawings, particularly FIG. 10. Single word transfer is effected through logic gates which allow any computer to address a memory location of any auxiliary unit at random. This not only provides for communication between the computers and the auxiliary units, each of which may comprise, for example, an independent data processor for primary functions in a command and control application, but also for communication between the computers. Thus, for computer-to-computer communication, an auxiliary unit constitutes a communication channel.

Data is transferred between computers at a time selected by the transmitting computer. For that purpose, an interruption of the program being processed in the receiving computer is effected by the transmitting computer. The receiving computer then executes a subroutine which causes it to read a word placed in a specified memory location of an auxiliary unit by the transmitting computer.

The instructions for block transfer to and from the auxiliary units are CTB and CFB, the respective operation codes of which are octal 60 and 64. The words of a block to be transferred are read from or stored in successive memory locations of the auxiliary unit associated with the computer receiving or transmitting the data starting with the address octal 00, or such other starting address as may be specified by the computer, to the end address octal 77 of a particular block of sucessive memory locations, referred to hereinafter as a channel, in the auxiliary unit associated with the computer. The particular channel of a given auxiliary unit may be the entire memory, as where it is the scratch pad memory of a separate computer, or merely a pre-assigned block of addresses. In the illustrative embodiment of the invention the octal codes 74, 75, and 76 are pre-assigned the blocks of memory in the auxiliary units 11, 12 and 13, which are associated with and therefore correspond to channels 74, 75 and 76 of the respective computers 1, 2 and 3. For example, the instruction CTB–3000 in the computer 1 will replace the words in memory locations 00 to 77 of the auxiliary unit 11 (which is associated with the computer 1 for block transfers) with words from the memory locations 00 to 77 of the channel 30 in the computer. As another example, the instruction CTB–4537 will replace the words in memory location 37 to 77 of the auxiliary unit 11 with words from locations 37 to 77 of channel 45 in the computer. Thus, a block-transfer operation begins with the word at the memory location specified by the last two octal digits of these address and continues through the last memory location of the channel, which channel is specified by the first two octal digits of the address.

The instruction CFB to transfer a block of words from an auxiliary unit to its associated computer is performed in an analogous manner. Thus the first two octal digits of the address portion of an instruction specify the channel into which the data from the auxiliary unit is to be transferred, and the last two octal digits specify the starting address for the block transfer.

Where block-transfer instructions are to be employed for the purpose of always transferring an entire channel, the control obviously may be modified to allow for the transfer to begin immediately after the instruction has been decoded by using the sector counter of the disc-memory to address the core memory in the auxiliary unit. In that manner, a transfer operation may commence immediately upon reading the transfer instruction. Alternatively, two instructions may be added in the present system with the octal codes 20 and 24 to transfer complete channels in addition to the instructions CTB and CFB just described.

From the discussion thus far, it should be apparent that a single computer and associated auxiliary unit connected in this manner comprise an integral system with both serial disc memory and parallel core memory capability. The tremendous potentialities provided thereby are increased manyfold by combining a plurality of such integral systems into a multiple computer system. For some applications, the serial disc memory portion of the system may become a large scale information storage medium such as a disc file while the auxiliary unit may logically be a high speed arithmetic data processing section as suggested hereinbefore. Alternatively, the present serial computing capability of the disc memory computer could be retained to provide relatively slow speed multi-processing concurrently with the high speed computation of the magnetic core system. In addition, the core memory portion of the system could be replaced with equivalent random access memories such as a thin film memory or the like.

Single word transfer operations are accomplished with standard computer instructions such as STR, STO, and CLA. The first instruction STR is to store in a memory location, which may be in any auxiliary unit, the content of an R register in the computer. The second instruction STO stores the content of an A register of the computer in a similar manner. The third instruction CLA clears the A register and adds an operand from a specified memory location in the auxiliary unit. Many more instructions are listed in the aforementioned copending application.

Figure 2:
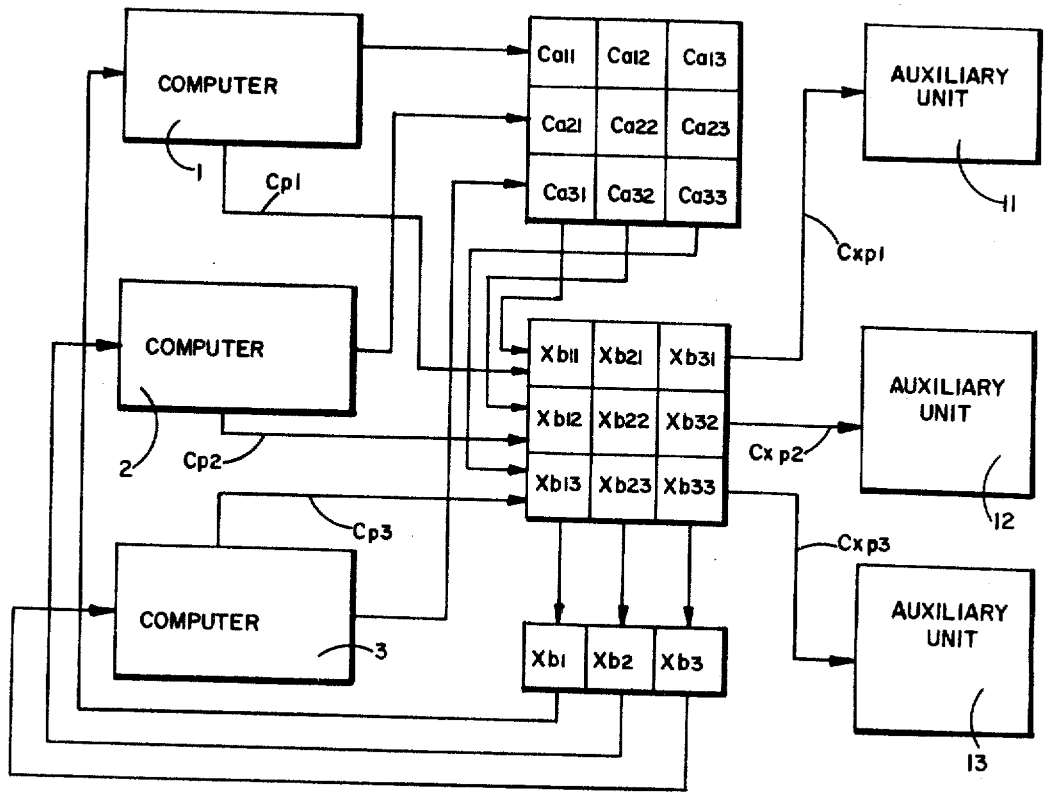
FIG. 2 is a block diagram of a logic network for priority control of communications between the computers and auxiliary units of the system of FIG. 1.

Addressing the core memory in an auxiliary unit is accomplished in the following manner: Since the internally stored program in any one of the three computers can address any auxiliary unit for instructions or data, the translation from the computer code into an auxiliary unit address signal is independently accomplished within the logic network 10 via one of three selection flip-flops associated with each computer as shown in FIG. 2. The selection flip-flops associated with the computer 1 are $Ca11$, $Ca12$, and $Ca13$. Similarly, the selection flip-flops associated with computer 2 are $Ca21$, $Ca22$, and $Ca23$ and in computer 3 are $Ca31$, $Ca32$ and $Ca33$. The first number associated with a given one of the flip-flops specifies the computer addressing one of the auxiliary units and the second digit specifies the auxiliary unit being addressed. For example, the flip-flop $Ca11$ is set when computer 1 is addressing auxiliary unit 1 and the flip-flop $Ca32$ is set when the computer 3 is addressing unit 2. From this it may be seen that more than one of those flip-flops may be set at any one time. Indeed, three of those flip-flops may be set at the same time provided two computers are not addressing the same auxiliary unit.

To prevent two computers from addressing the same unit at the same time, additional flip-flops, such as the flip-flop $Xb11$ in FIG. 2, are provided as traffic control flip-flops. The traffic control flip-flops $Xb11$, $Xb21$ and $Xb31$ are all associated with the auxiliary unit 11 as symbolically indicated by the second digit. Accordingly, if any one of the traffic control flip-flops associated with the auxiliary unit 11 is set, such as the flip-flop $Xb11$ when the computer 1 is addressing the auxiliary unit 11, another flip-flop cannot be set by one of the other computers seeking to gain access to the same auxiliary unit. Once access is obtained by a given computer to an addressed auxiliary unit, an access-acknowledging flip-flop $Xb1$, $Xb2$ or $Xb3$ is set to transmit a signal to the computer as indicated in FIG. 2.

The traffic control flip-flop which is set upon a computer addressing one of the auxiliary units is also employed to couple a corresponding one of the clock pulses $Cp1$, $Cp2$ and $Cp3$ from the addressing computer to the auxiliary unit as a complex clock according to the following logic equations:

$$Cxp1=Cp1Xb11Xb21'Xb31'+Cp2Xb21Xb11'Xb31'+Cp3Xb31Xb11'Xb21'$$
$$Cxp2=Cp1Xb12Xb22'Xb32'+Cp2Xb22Xb12'Xb3'+Cp3Xb32Xb12'Xb22'$$
$$Cxp3=Cp1Xb13Xb23'Xb33'+Cp2Xb23Xb13'Xb33'+Cp3Xb33Xb13'Xb23'$$

For instance, when the computer 3 addresses the auxiliary unit 12, the $Ca32$ flip-flop is set and if the auxiliary unit 12 is not being addressed by some other computer as evidenced by the control flip-flops $Xb12$ and $Xb22$ not being set, the flip-flop $Xb32$ is set. Upon the flip-flop $Xb32$ being set, the access-acknowledging flip-flop $Xb3$ is set and the clock pulse $Cp3$ is translated from the computer 3 to the auxiliary unit 12 as a complex clock pulse $Cxp2$ in order that the operation of the auxiliary unit 12 be synchronized with the operation of the computer during the process of transferring data therebetween.

Each of the flip-flops is synchronized with the operation of its associated computer. For instance, the flip-flops $Ca11$, $Ca12$, $Ca13$, $Xb11$, $Xb12$ and $Xb13$, are synchronized by a clock pulse $Cp1$ from the computer 1. The acknowledging flip-flops $Xb1$, $Xb2$ and $Xb3$ are synchronized by the computers 1, 2 and 3, respectively. The synchronization is accomplished by clock pulses $Cp1$, $Cp2$ and $Cp3$ from their respective computers applied to the clock input terminals of the associated flip-flops. The remaining flip-flops in the logic control network 10 (FIG. 1) to be described are synchronized by the complex pulse translated by the traffic control flip-flops to the auxiliary units. Accordingly, it should be understood that all of those flip-flops receive a clock pulse although no further mention of that will be made.

Figure 4:
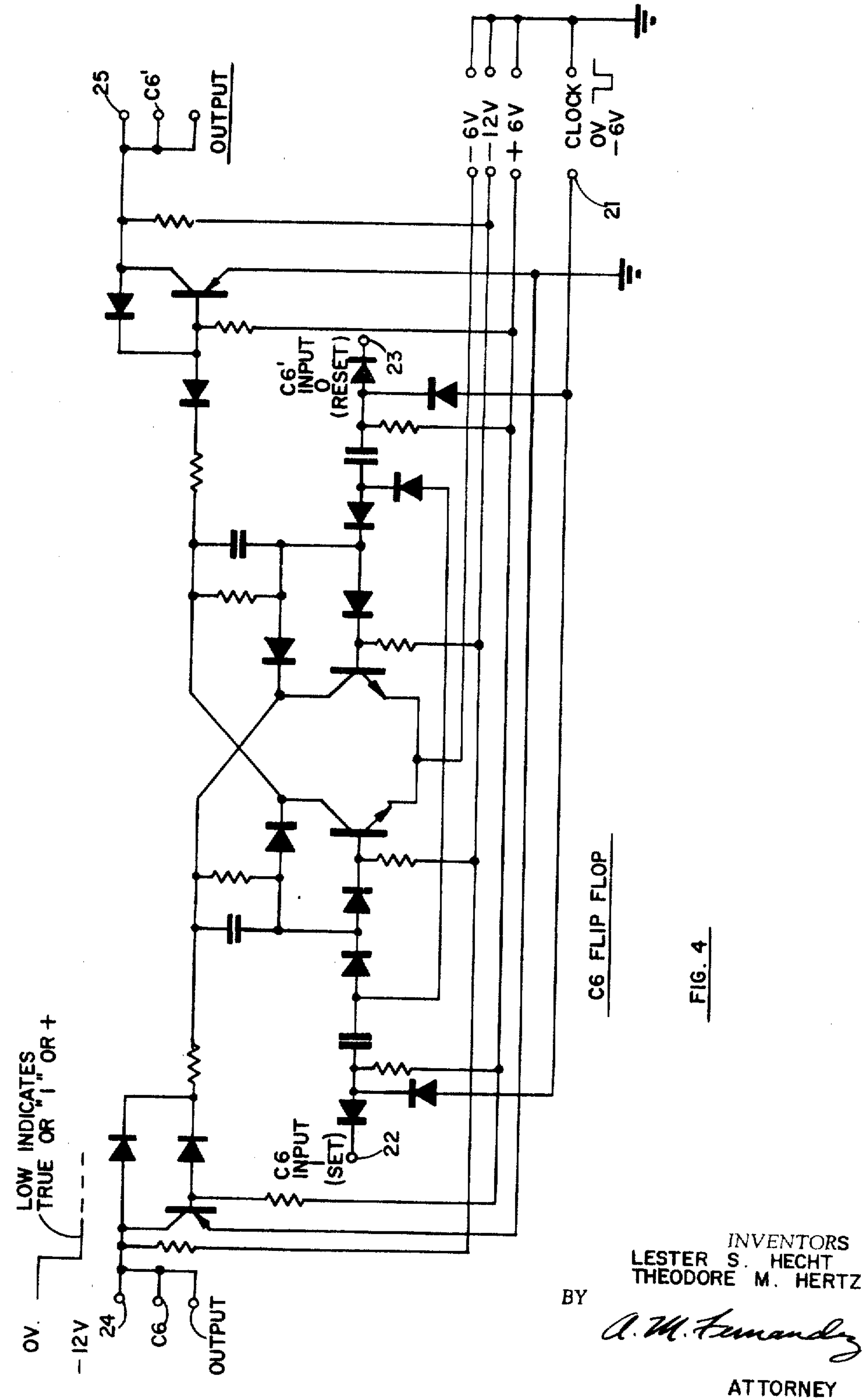
FIG. 4 is a circuit diagram of a synchronous flip-flop employed throughout the multiple computer system.

A circuit diagram for the flip-flops is illustrated in FIG. 4. It is conventional in design and therefore will not be described herein except to point out that the clock pulse is applied at a terminal 21 while set and reset input signals are applied to input terminals 22 and 23, respectively. Negative diode logic is employed of the type described at page 33 by R. K. Richards in Arithmetic Operations in Digital Computers, published by D. Van Nostrand (1955), so that a negative-going clock pulse is required to gate a negative set signal at the input terminal 22 or a negative reset signal at the input terminal 23. The true output signal of the flip-flop is a −12 volt signal derived from the output terminal 24 of the flip-flop when it is set in its true state by a negative input signal applied to the input terminal 22, A complementary signal is derived from the false output terminal 25 which, when the flip-flop is set, is a 0-volt signal.

After access to an auxiliary unit has been requested and granted according to a pre-determined order of priority by the control system described with reference to FIG. 2, communication between a computer and the following detailed description, communication between the computer 1 and the auxiliary unit 11 will be considered. However, all of the functions such as the character count control and the informtion transfer control are the same for all auxiliary units. Only the minor differences in the auxiliary units 12 and 13 will be described later. However, it is important to note at the outset that the auxiliary unit 11 associated with the computer 1 is the only unit which that computer may address for a block transfer operation. For single-word-transfer operations, the computer 1 may address any of the auxiliary units 11, 12 and 13 in the same manner as it addresses its internal memory. The addresses assigned to the auxiliary units are octal 74, 75 and 76 for the auxiliary units 11, 12 and 13, respectively. Each of those addresses correspond to the address and octal code of channels 74, 75 and 76 in each of the computers 1, 2 and 3. Accordingly, except for block transfer instructions CTB and CFB, all addresses having the channel octal codes 74, 75 and 76 refer to the auxiliary units 11, 12 and 13.

*Auxiliary unit access request*

The computer logic for establishing a request for access into the various units will now be considered in detail, but first it will be helpful to review the general operation of such a request. During the first word-time of the computer instruction search mode of operation, represented by a primary gate signal I*c* if the auxiliary unit is being addressed for the purpose of obtaining the next instruction, or the first word-time of the number search mode of operation represented by a primary gate signal I*n* if the unit is being addressed to obtain an operand therefrom, the address is analyzed to determine whether or not the channel code is octal 74, 75 or 76. If the channel code 74 of the auxiliary unit 11 is detected, the flip-flop *Ca*11 of FIG. 2 is turned on to indicate that the computer 1 is requesting access to the auxiliary unit 12. Finally, if the channel code 76 is detected, the flip-flop *Ca*13 is turned on, indicating that the computer 1 is requesting access to the auxiliary unit 13. The other six flip-flops provide the inter-communication request signals for the computers 2 and 3 in a similar manner.

Figure 7:
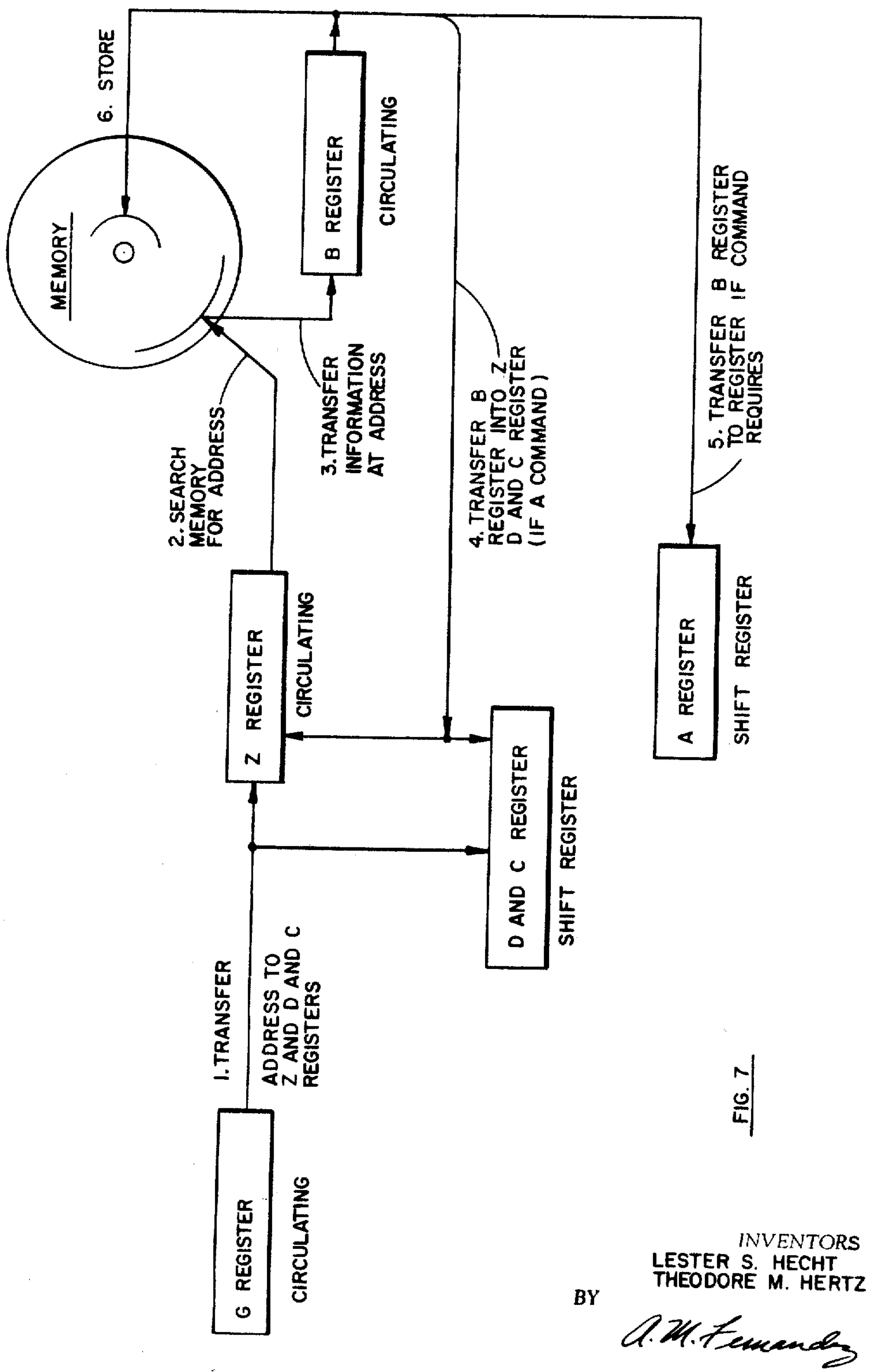
FIG. 7 illustrates a functional diagram of typical operations in a computer.

The operation mode in the computer is controlled by five flip-flops K*c*, D*o*, I1, I2 and I4 in the computer itself. Those flip-flops and their states for the various modes of operation are illustrated in FIG. 7. The code I*c*, used to fetch the next instruction from memory, is represented by the code 001 for the control flip-flops I4, I2 and I1. That mode consists of three phases, the first of which is represented by I*c*D*o*'K*c* as illustrated for the first block in the flow chart of FIG. 8. During that phase an instruction analysis is performed to determine the type of memory specified for the next instruction. Following that analysis, a search for the next instruction is made during the succeeding word-times. The search phase is represented by I*c*D*o*'K*c*'. During the final phase of mode I*c*, represented by I*c*D*o*K*c*', the next instruction is transferred to the B register in the computer.

Figures 5, 6:
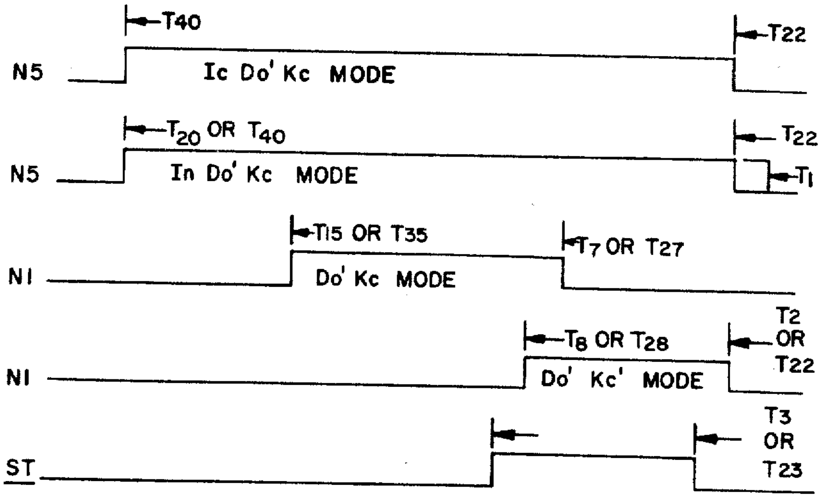
FIG. 5 is a chart illustrating the organization of computer instructions and the operation code of representative instructions, some of which are particularly adapted for use in the multiple computer system of FIG. 1.
FIG. 6 is a timing diagram of various signals which control operations within a computer.
Figure 9:
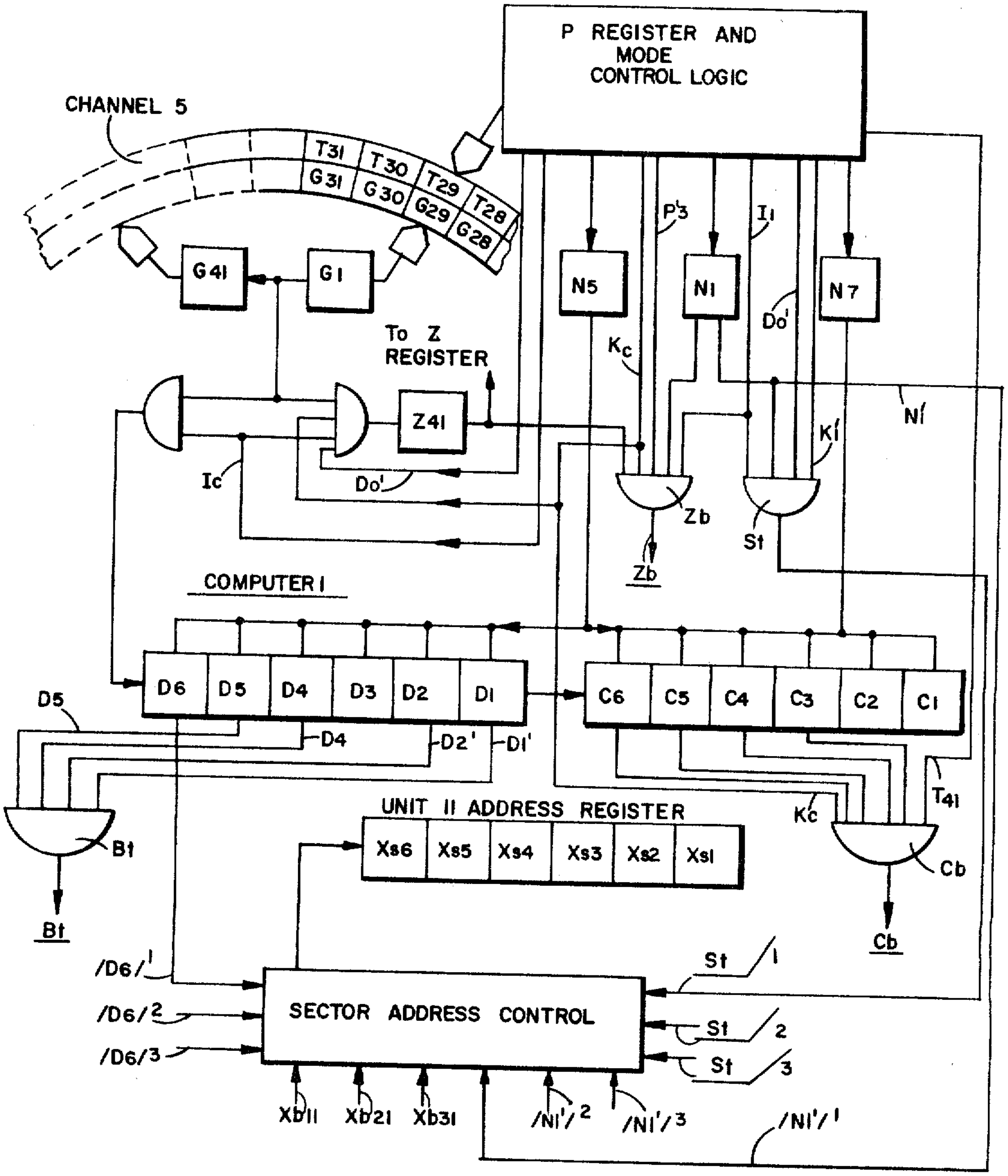
FIG. 9 is a schematic diagram of logic network for addressing an auxiliary unit from a computer.

During the first phase of the I*c* mode, the address of the next instruction is transferred from a G register into D and C registers as shown in more particular detail in FIG. 9. This transfer is timed by a control flip-flop N5 which is turned on by logic I*c*K*c*T22 and turned off at time T40 by the logic D20I4' as more fully described in the aforementioned copending application. Referring to FIGS. 5 and 6, it will be noted that this provides a signal N5 during a bit-timing interval T23 through T40 to control a shift of the channel code in bit positions 29 through 34 into the C register via the D register. Thus, at the end of the shifting interval the bits in the flip-flops D6 to D1 of the D register, and C6 to C1 of the C register, are 40 to 35 and 34 to 29, respectively. The digits 34 to 29 are the channel code digits employed to select the memory channel in the computer or one of the auxiliary units if the code is octal 74, 75 or 76.

While the channel address is being transferred into the C register, the content of the G register is also being transferred to the Z register in order that the sector address code may be serially compared with sector addresses read from a separate sector track.

Referring to FIG. 9, it may be noted that the N5 signal controls only flip-flops $C_6$ and $C_5$ for reasons which are not pertinent to the present invention. However, a flip-flop N7 is set to provide a shift control signal for the remaining stages $C_4$, $C_3$, $C_2$ and $C_1$ while the flip-flop N5 is set to transfer the channel code into the C register.

For bit timing or synchronization within the computer, channel 5 illustrated in FIG. 9 has permanently recorded thereon signals to produce a pulse for each bit location of memory in other tracks. Each pulse read from the channel 5 is transmitted to a P counter comprising flip-flops $P_1$ to $P_6$ which counts the 40-bit locations within a memory sector or location for one word or instruction plus one location for a synchronizing bit. FIG. 10 illustrates in tabular form the operation of the P counter. Upon inspecting the figure, it will be noted that various bit times are immaterial and further that not all the flip-flops $P_1$ to $P_6$ need be sampled to determine certain bit times. For example, at bit time T2 it is not necessary to determine the state of the flip-flop $P_4$ inasmuch as digit time T22 can be distinguished from the bit time $T_2$ by the state of the flip-flop $P_6$. Thus, several gates connected to selected output terminals of the P counter develop certain timing signals such as T8, T13, T14 and T20 which, together with further signals selected from output terminals of the P counter establish specific bit times within a computer word time. The logical equations for the operation of the P counter are indicated in FIG. 10. Included in the timing system are two special flip-flops $T_1$ and $T_{41}$ (not shown) which indicate the bit times $T_1$ and $T_{41}$ according to the logical equations as shown opposite those bit times in the table of FIG. 10.

At the same time that the contents of the G register are being transferred to the Z register, and the D and C registers, during the first phase of the mode I*c*, one of the flip-flops *Ca*11, *Ca*12 or *Ca*13 is set if the channel code being transferred into the C register via the D register is the octal code 74, 75 or 76. Referring now to the following detailed logical equations, it should be noted that it is operative during the first word time of the I*c* mode, or the I*n* mode to be described more fully hereinafter, as indicated by the mode control signal K*c*.

$$1ca11=\underline{C}b\underline{I}cXil'+\underline{C}b\underline{I}nD5+\underline{C}b\underline{I}nD4'\underline{Mtm}+\underline{I}n\underline{B}tK41''\underline{I41Xib}$$

$$0ca11=\underline{Ic}DoT41+Ca12'\underline{It1}+Ca13'\underline{It1}+\overline{13}a+I1'D4+I1'K41$$

$$1ca12=In\underline{Bt}K41+\underline{Zb}P4'$$

$$0ca12=Ca\overline{13}\underline{It1}+\overline{C}a11'\underline{It1}+13a+I1'D4$$

$$1ca13=In\underline{Bt}\overline{K}41+\underline{Zb}P2'$$

$$0ca13=Ca\overline{12}\underline{It1}+\overline{C}a11'\underline{It1}+13a+I1'D4$$

Where:

$$\underline{I41}=I2'$$
$$\underline{Xib}=Xi1Xb1'$$
$$\underline{Mtm}=Ka'D3D1Xb1'$$
$$\underline{Cb}=C6C5C4C3KcT41$$
$$\underline{It1}=I1Do'T1$$
$$\underline{Zb}=Z41'I1KcN1P3'$$
$$1Z41=G1IcKcDo'$$
$$0Z41=G1'IcKcDo'$$

The operation of the foregoing logical equations may be more fully understood by reference to the following table:

| Aux. Unit | Channel Octal Code | Channel Bit | | | | | |
|---|---|---|---|---|---|---|---|
| | | 6 | 5 | 4 | 3 | 2 | 1 |
| 11 | 74 | 1 | 1 | 1 | 1 | 0 | 0 |
| 12 | 75 | 1 | 1 | 1 | 1 | 0 | 1 |
| 13 | 76 | 1 | 1 | 1 | 1 | 1 | 0 |
| ---- | 77 | 1 | 1 | 1 | 1 | 1 | 1 |

From that table it may be seen that the flip-flop *Ca*11 should be set if the four most significant bits of the channel code in the C register are all equal to 1 and the remaining bits in flip-flops $C_2$ and $C_1$ are equal to 0. That condition exists only when the auxiliary unit 11 is being addressed by the computer being considered. If only the bit stored in the flip-flop $C_2$ is equal to 0, the *Ca*12 flip-flop is set indicating that the auxiliary unit 12 is being addressed. Similarly, if only the bit in the flip-flop $C_1$ is equal to 0 the flip-flop C*a*13 is set.

At the end of the first word time of the I*c* mode, or the I*n* mode, a primary gate C*b* transmits a signal $\underline{Cb}$ if the more significant channel bits are true, which covers the channel octal codes 74, 75, 76 and 77. The signal $\underline{Cb}$ from the primary gate C*b* of computer 1 illustrated in FIG. 9 is employed to set the flip-flop C*a*11 under one possible condition during the I*c* mode and two possible conditions during the I*n* mode. Referring to the foregoing logic, the first gate C*b*I*c*X*i*1′ sets the C*a*11 flip-flop, unless an interrupt flip-flop X*i*1 associated with the computer 1 has been set by a programmed interrupt instruction CON (octal code 04) executed in one of the other computers which would cause the computer 1 to jump to a specified subroutine to read a predetermined memory location in the auxiliary unit 11 under the control of the last gate I41X*ib*. Such a jump is timed to occur during the third phase of the I*c* mode, as specified by the term I41 which is equal to I2′I1D*o*, which is the phase employed to transfer an instruction from a memory location to the B register as indicated by the flow diagram in FIG. 7.

The two conditions under which the C*a*11 flip-flop is set during the I*n* mode of operation are specified by the gate C*b*I*n*D5 for instructions requiring memory access, and the gate C*b*I*n*D4′M*tm* which occurs for two store commands, namely STO and STR. The remaining gate I*n*B*t*K41 sets the flip-flop C*a*11 during any block transfer operation as specified by the primary gate B*t* which transmits a signal $\underline{Bt}$ for any CTB or CFB instruction executed by computer $\underline{1}$. The primary gate B*t* which detects the operation code for a CFB or CTB instruction is illustrated in FIG. 9.

Since the primary gate C*b* transmits a signal $\underline{Cb}$ if the four most significant bits of the channel code are all equal to one, which covers the octal codes 74, 75, 76 and 77, the flip-flop C*a*11 is set by one of the aforementioned gates if any one of the auxiliary units is being addressed. Accordingly, if the flip-flop C*a*11 is not set, it is inferred that none of the auxiliary units are being addressed by the computer 1 and the other flip-flops C*a*12 and C*a*13 are reset by the gate $Ca11'\underline{It1}$ associated with each. If the flip-flop C*a*12 is set, the flip-flops C*a*11 and C*a*13 are reset by the gate $Ca12\underline{It1}$ because it is not possible to have both channel codes 74 and 75, or both channel codes 75 and 76 specified at the same time. Similarly, if the flip-flop C*a*13 is set, the flip-flops C*a*11 and C*a*12 are reset by the gate $Ca13\underline{It1}$. If both flip-flops C*a*12 and C*a*13 are set, it means that the channel 74 is specified and therefore only the flip-flop C*a*11 should remain set; accordingly, the set flip-flop C*a*12 resets the flip-flop C*a*13 through the gate $Ca12\underline{It1}$ and the set flip-flop C*a*13 resets the flip-flop C*a*12 through the gate $Ca13\underline{It1}$. If neither of the flip-flops C*a*12 or C*a*13 is set, it means that the first two channel code bits are both equal to one and that therefore a channel code 77 may have been specified. Since the channel code 77 does not correspond to any auxiliary unit and particularly does not correspond to the auxiliary unit 11, the flip-flop C*a*11 is turned off by the gates $Ca12'\underline{It1}$ and $Ca13'\underline{It1}$.

In summary, every channel code transferred into the C register is decoded by the primary gate C*b* (FIG. 9) to determine whether the foremost significant bits are all equal to 1. If so, it is presumed that the associated auxiliary unit 11 is being addressed and the C*a*11 flip-flop (FIG. 2) is set; however, if that is not the case, and one of the other flip-flops C*a*12 and C*a*13 is set, the flip-flop C*a*11 is reset. And finally, if neither the C*a*12 nor the flip-flop C*a*13 is set, then the flip-flop C*a*11 should not have been initially set and is automatically reset.

The remaining logic gates associated with the flip-flops C*a*11, C*a*12 and C*a*13 provide for the termination of auxiliary unit access; accordingly, all of those flip-flops are reset at the beginning of any arithmetic instruction indicated by the presence of an I3*a* signal coupled to the reset terminal of each flip-flop through the OR gate indicated by the foregoing equations pertaining thereto. In addition, termination is effected at the beginning of any instruction having a bit 1 in the D4 position which are instructions that do not require an operand. The gate I1′D4 is coupled to each of the reset terminals of those flip-flops for that purpose. The remaining termination gate is I1′K41 coupled to the reset terminal of the flip-flop C*a*11 which is effective at the conclusion of the remaining operations for which termination of auxiliary unit access has not otherwise been provided. After the flip-flop C*a*11 is reset the gates $Ca11'\underline{It1}$ assure that the remaining flip-flops C*a*11 and C*a*12 are also reset at the beginning of the next I*c* mode of operation.

*Priority control logic*

After access to an auxiliary unit has been made and one of the flip-flops C*a*11, C*a*12 or C*a*13 has been set, a particular one of the priority control flip-flops associated with the addressed auxiliary unit and the addressing computer must be set before access to the memory channel in the auxiliary unit is actually made and data transferred. For the auxiliary unit 11, there are three associated priority control flip-flops, one for each computer, namely the flip-flops X*b*11, X*b*21 and X*b*31.

According to the priority scheme described hereinbefore with reference to FIG. 2, each computer is given first priority over its associated auxiliary unit. Second priority is given to the computer 2 and third priority to computer 3. Thus, for the auxiliary unit 11, the logical equations for setting the priority control flip-flops associated with the auxiliary unit 11 are as follows:

$$1Xb11=/T2/^{1}Ca11\underline{Xb01}$$
$$0Xb11=Ca11'$$
$$1Xb21=/T2/^{2}Ca21Ca11'\underline{Xb01}$$
$$0Xb21=Ca21'+Xb11$$
$$1Xb31=/T2/^{3}Ca31Ca21'Ca11'\underline{Xb01}$$
$$0Xb31=Ca31'+Xb11+Xb21$$

Where $$\underline{Xb01}=Ca11'Ca21'Ca31'$$

According to the foregoing logical equations, only one of the three priority control flip-flops can be set at any one time. The flip-flop X*b*11 may be set at time T2 of computer 1 if a request for access to the auxiliary unit 11 has been made as indicated by the presence of a C*a*11 signal, and if no other priority control flip-flop is presently set as is indicated by the signal $\underline{Xb01}$. The flip-flop X*b*21 is set at time T2 of the computer $\underline{2}$ if a request has been made by that computer to use the auxiliary unit 11, as is indicated by a signal C*a*21, provided that a request is not also made by computer 1, which condition is indicated by the signal C*a*11′ and priority has not already been granted to another computer as is indicated by the signal $\underline{Xb01}$. Finally, the flip-flop X*b*31 is set at the time T2 of the computer 3 if a request for access to the auxiliary unit 11 is made by that computer as is indicated by a signal C*a*31, providing that no current requests are being made by computers 1 and 2 and access has not already been granted to a computer having higher priority.

The primary means of resetting the priority control flip-flops X*b*11, X*b*21 and X*b*31 is the false signals C*a*11′, C*a*21′ and C*a*31′ derived from the zero or false output terminals of the respective flip-flops C*a*11, C*a*21 and C*a*31 when they are reset. Accordingly, as soon as auxiliary unit access is terminated as described hereinbefore, the priority control flip-flops are reset thereby signalling the completion of the particular communication of a unit with the computer 1. The additional terms X*b*11 and X*b*21 which are shown for resetting the flip-flops X*b*21 and X*b*31 are added as a precaution to prevent inadvertently turning on more than one priority control flip-flop. Thus, the flip-flop X*b*21 is reset by the signal X*b*11, and the flip-flop X*b*31 is reset by either the signal X*b*11 or X*b*21. Accordingly, if the flip-flop X*b*11 is set, the other flip-flops will immediately be reset if inadvertently set, while if the flip-flop X$b$21 is set, the flip-flop X$b$11 would not have been set and the flip-flop X$b$31 is reset if inadvertently set.

An additional flip-flop is included in the logic network 10 (FIG. 1) for each of the computers to indicate when access to an auxiliary unit has been granted. Those flip-flops are the X$b$1, X$b$2 and X$b$3 flip-flops shown in FIG. 2, each of which provides a signal to its associated computer indicating that access to an auxiliary unit has been granted and transfer of data may be undertaken. The logic network for setting and resetting those flip-flops in response to the state of the priority control flip-flops is as follows:

$$1Xb1=Xb11+Xb12+Xb13$$
$$1Xb2=Xb21+Xb22+Xb23$$
$$1Xb3=Xb31+Xb32+Xb33$$
$$0Xb1=Xb11'Xb12'Xb13'$$
$$0Xb2=Xb21'Xb22'Xb23'$$
$$0Xb3=Xb31'Xb32'Xb33'$$

This logic provides a single control term for use in several places in the computer to modify its mode control in a manner which will now be described.

*Mode control*

As noted hereinbefore, automatic channel code detection for both instructions and operands is made to determine whether the channel address specifies one of the auxiliary units. If so, logic turns on one of the access request flip-flops associated with the particular computer, such as the flip-flops C$a$11, C$a$12 and C$a$13 associated with the computer 1. If a block transfer instruction, either CTB or CFB, is to be executed by one of the computers 1, 2 or 3, one of the access flip-flops associated with both that computer and its auxiliary unit is turned on, namely the flip-flops C$a$11, C$a$22 and C$a$33 associated with the computers 1, 2 and 3 for block transfer operations.

Figure 8:
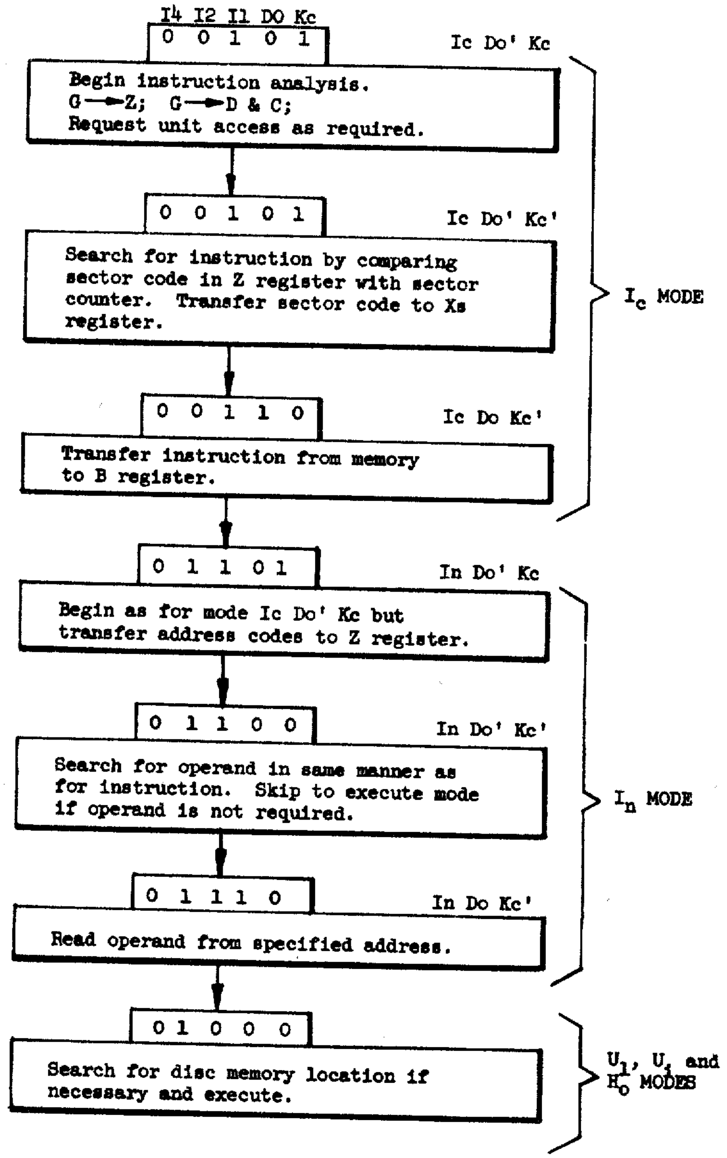
FIG. 8 is a flow diagram of various modes of operation in the computer.

During the first phase or word time of both the I$c$ and the I$n$ modes of operation, the address of the next instruction or operand is transferred from the G register into the D and C registers as noted hereinbefore with reference to FIGS. 8 and 9. A better understanding of the computer operation may be had by reference to FIG. 6. After the G register has been copied into the Z register and the D and C registers in step 1, the content of the Z register is serially compared with the sector track codes until the memory location being addressed is found. That is generally indicated as step 2. When an auxiliary unit is being addressed, that step is curtailed since the core memory in the auxiliary unit is randomly accessible. When the memory location addressed has been found, the operand or instruction stored therein is transferred to the B register as generally indicated by step 3. If the mode of operation is I$c$ for obtaining the next instruction, the next step is to transfer the content of the B register into the Z, and D and C registers. Thus, that portion of the instruction which pertains to the operation and channel codes is transferred into the D and C register. The Z register, on the other hand, receives the entire instruction. Following that, the operand is located by searching the memory for the location specified by the sector code in the Z register in the same manner as described hereinbefore for step No. 2. When the operand is located, it is read into the B register. That occurs during the last word time of the I$n$ mode. Following that, the operation specified by the instruction is executed. If it is an arithmetic operation, for example, the content of the B register is transferred to the A register as indicated generally by step 5. If the instruction is to store, the content of the B register is stored in the specified memory location as generally indicated as step 6.

The first control which must be effected in logic network 10 (FIG. 1) after the computer gains access to an auxiliary unit is to read into the address register X$s$1 to X$s$6 in FIG. 9 the sector address for the instruction or the operand from the computer which has just gained the access. This is accomplished in response to one of three primary gate signals $\underline{St}/1$, $\underline{St}/2$ or $\underline{St}/3$ generated within the respective computers 1, 2 and 3, and is applied to the sector address control logic of the auxiliary unit being addressed. For example, if computer 1 is addressing the auxiliary unit 11, as soon as access has been granted an $\underline{St}/1$ signal is transmitted to the sector address control in response to the following logic:

$$\underline{St}/1=N1I1Do'Kc'$$

where the timing signal N1 is as shown in the timing diagram of FIG. 6 during the D$o$'K$c$' mode of operation.

From that timing diagram of FIG. 6 it may be seen that the foregoing logic equation provides a timing signal which effectively adds a 1 bit time delay to the signal N1 upon developing the primary gate signal $\underline{St}/1$ in the computer 1. This delay is necessary since the timing signal N1 in the computer is designed to read the sector code directly from the computer memory read flip-flop M$r$ whereas the auxiliary unit control system reads the sector code one bit time later from the flip-flop D6 into the X$s$6 flip-flop of the address register.

Figure 11:
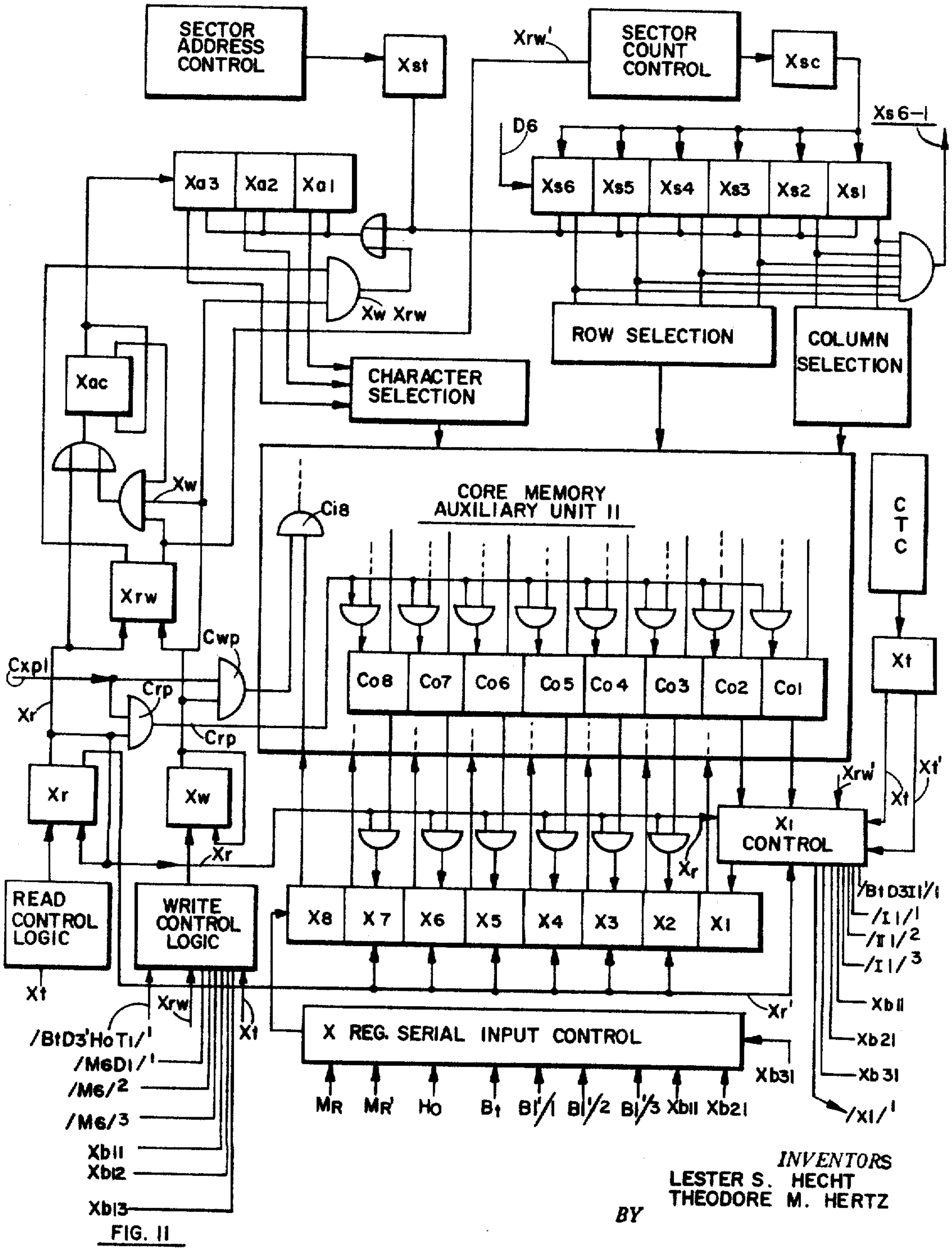
FIG. 11 is a schematic diagram of logic network for controlling the transfer of data into and out of an auxiliary unit during either block-transfer operations or single-word-transfer operations.

The sequence of operations for reading a sector code from a computer, such as computer 1, into the auxiliary unit address register is as follows: First, the flip-flop X$b$1 is turned on at time T2 of the particular computer which gains access to the auxiliary unit. At time T3, the N1 flip-flop shown in FIG. 8 is set for the first time. Thereafter, at time T4, when the least significant bit of the sector address is in the flip-flop D6 of the D register in computer 1, a flip-flop X$st$ of the auxiliary unit 11 shown in FIG. 11 is set and is effective thereafter to control the gating of the sector code information from the flip-flop D6 in computer 1 into the flip-flop X$s$6 in the auxiliary unit 11. The logic for shifting the sector code into the address register flip-flops X$s$1 to X$s$6 is as follows:

$$1xst=/\underline{St}/^1Xb11+/\underline{St}/^2Xb21+/\underline{St}/^3Xb31$$
$$0xst=/N1'/^1Xb11+/N1'/^2Xb21+/NL'/^3Xb31$$
$$1xs6=/D6/^1XstXb11+/D6/^2XstXb21+/D6/^3XstXb31$$
$$0xs6=/D6'/^1XstXb11+/D6'/^2XstXb21+/D6'/^3XstXb31$$

$$1xs5=Xs6Xst$$
$$0xs5=Xs6'Xst$$
$$1xs4=Xs5Xst \qquad 1xs3=Xs4Xst$$
$$0xs4=Xs5'Xst \qquad 0xs3=Xs4'Xst$$
$$1xs2=Xs3Xst \qquad 1xs1=Xs2Xst$$
$$0xs2=Xs3'Xst \qquad 0xs1=Xs2'Xst$$

Once the sector address which specifies a memory location in the auxiliary unit 11 has been transferred into the address register X$s$6 to $Xs1$, the core memory in the auxiliary unit 11 may be addressed directly in the manner described with reference to FIG. 3.

*Read mode control*

In order to initiate a cycle for reading a location in the core memory of the auxiliary unit 11, it is necessary to include logic which sets a flip-flop X$r$ (FIG. 11) in advance of the beginning of the serial transmission time to the computer, thereby initiating a core read cycle at time T38 so that the core reading may actually begin at time T39, a bit time before the word time during which the information read is to be transferred serially into the computer. The logic to accomplish that is as follows:

$$1xr=/\underline{T38}Do'I1/^1Xb11+/\underline{T38}Do'I1/^2Xb21+/\underline{T38}Do'I1/^3Xb31$$

The core read pulse C$rp$ which is transmitted to the core memory of the auxiliary unit No. 11, the first of which occurs at time T39, is generated according to the following logic: $Crp=XrCsP1$. Thus, the read cycle actually begins at time T39 of computer 1 in the present example in order that the first 8-bit character read from the cores may be transferred into a core memory register C$o$1 to C$o$8 in time for synchronous transfer to the computer.

When the auxiliary unit is being addressed by the computer it is necessary to inhibit the normal operation of searching for a memory location in the magnetic disc memory of the computer since the core memory in the auxiliary unit is a random access memory and does not require a serial searching operation. However, the searching mode of the computer, which is represented by I1Kc' as shown in the flow diagram of FIG. 8, cannot be terminated immediately upon determining that a core memory address has been specified for an instruction or an operand since the auxiliary unit being addressed may not be immediately accessible. Accordingly, the logic equation which resets the mode control flip-flop I1 in the computer is inhibited by a term $Ca1'$, where:

$$Ca1'=Ca11'\ Ca12'\ Ca13'$$

for the computer 1 which indicates that the computer 1 has not gained access to an auxiliary unit. Accordingly, the I1 flip-flop in the computer 1 is not reset and the computer proceeds to make a search. The gate with this inhibiting function appears on the reset side of the flip-flop I1 as follows:

$$Oi1=\underline{In}D5'\underline{KoCa1'}$$

Other control gates for that flip-flop are described in the foregoing copending application. The terms I*n*D5'K*o* of the foregoing equation normally resets the flip-flop I1 at time T41 in order to skip a search phase for instructions having a binary digit 0 in the fifth most significant position of the operation code, namely the D5 position, since those instructions do not require a search for an operand such as the instruction to store the content of the A register in a specified location. However, the specified location may be a core address in an auxiliary unit not available. Consequently, the $Ca1'$ term is added to the gate of the foregoing equation as just noted to inhibit the skipping of the search phase when an auxiliary unit is specified as the memory. In other words, if an auxiliary unit is addressed, one of the flip-flops $Ca11$, $Ca12$ or $Ca13$ is set. If so, the term $Ca1'$ inhibits resetting the I1 flip-flop and mode control sequencing is suspended. Once access to the auxiliary unit being addressed is granted, and the flip-flop X*b*1 is turned on in the manner described hereinbefore with reference to FIG. 2, the search phase must be terminated by resetting the I1 flip-flop. That is accomplished by adding another gate to the reset side of the flip-flop I1 for the condition $\underline{In}D5'\underline{Ko}Xb1$. One other gate is added to the reset side of the flip-flop I1 for block transfer instructions CFB and CTB. That gate is for the condition $\underline{InKoBt}Xb1$.

To summarize the I*n* mode control modification during the search phase, if computer 1 detects a channel address octal 74, 75 or 76 in a manner more fully described hereinbefore, the computer determines immediately that an auxiliary unit is being addressed and the I*n* mode of operation remains in the search phase I1Kc' until the flip-flop X*b*1 is set. In the case of the auxiliary unit 1 being addressed by the computer 1, the flip-flop X*b*1 is turned on immediately after the request for access flip-flop C*a*11 is turned on unless the auxiliary unit is being addressed by some other computer. If so, the flip-flop X*b*1 is not set until the auxiliary unit 11 is available. Once the flip-flop X*b*11 is set, the flip-flop X*b*1 is set and the mode control flip-flop I1 is reset, either by the gate including the primary signal $\underline{Bt}$ for block transfer operations or by the gate including the signal D5' for operations which do not require reading an operand from the memory location such as store instructions.

Once core access is obtained, and an instruction or operand is to be read from a memory location in the auxiliary unit 11, the flip-flop I1 in the computer 1 remains on and the mode control flip-flop D*o* is turned on by the following gate:

$$1do=I1Kc'Do'Xb1T1$$

To prevent the flip-flop D*o* from being set by the normal search logic of the computer after access to the auxiliary unit has been made, the primary gate signal $\underline{Ca1'}$ described hereinbefore is added to the normal gate for setting the D*o* flip-flop as follows:

$$1do=So'\underline{Ko}I4'I1Do'Ca2'$$

For instructions to transfer from an auxiliary unit to a computer, the flip-flop D*o* must be turned on to permit transfer to the B register in the case of storing in the computer memory via the write flip-flops M*w*1 and M*w*2 in the computer. The gate for this control is as follows:

$$1do=\underline{WsKo}Xb1D1$$

Where:

$$\underline{Ws}=I4'I1'D4'D3D2'Do$$

For block transfer instruction CFB and CTB, the flip-flop D*o* is set at the next time T1 after access to the auxiliary unit being addressed has been obtained and the X*b*1 flip-flop has been set. The gate for this control is as follows:

$$1do=I1Kc'T1Do'Xb1$$

All of these gates for setting the flip-flop D*o* are coupled thereto by an OR-gate.

The logic for the flip-flop B41 illustrated in FIG. 10 (of the B register shown in FIG. 6) for either reading a word from a core memory location in an auxiliary unit or for reading a block of memory locations from an auxiliary unit is as follows:

$$b41=/X1/^1DoXb11+/X1/^2DoXb12+/X1/^3DoXb13$$

The three AND gates in the foregoing equation are associated with the auxiliary units 11, 12 and 13, respectively, as indicated by the priority control flip-flops X*b*11, X*b*12 and X*b*13. Two of the existing gates in the computer associated with the flip-flop B41 must be modified indirectly to inhibit existing logic from operating during a transfer of data from an auxiliary unit. The normal memory-read gate which is associated with the logic for setting the flip-flop B41 is M*r*D*o*K*a*'S*o*'. That gate is inhibited by turning on flip-flop S*o* for transfer operations from an auxiliary unit with the following logic:

$$1so=\underline{In}Kc'\underline{Bt}T1+I1Xb1T41'$$
$$0So=\underline{T}41$$

The existing write flip-flops M*w*1 and M*w*2 receive signals from the B register gates which include the primary gate signal $\underline{Mtm}$ which is modified to include the term X*b*1 as follows:

$$\underline{Mtm}=Ka'D3D1Xb1'$$

That change prevents the primary gate M*tm* from being effective while reading from the auxiliary unit during buffer transfer operations. The new gates which are effective during block transfer operations are as follows:

$$1mw1=/X1/^1\underline{Bt}D3\underline{Ho}$$
$$0mw1=/X1'/^1\underline{Bt}D3\underline{Ho}I2'T1'$$
$$1mw2=/X1'/^1\underline{Bt}D3\underline{Ho}$$
$$0mw1=/X1/^1\underline{Bt}D3\underline{Ho}I2'T1'$$

From the foregoing discussion it will be noted that writing directly into the computer disc memory from an auxiliary unit is performed during the buffer transfer operation specified by an instruction CFB as defined by the terms $\underline{Bt}D3\underline{Ho}$ of the foregoing equations. At all other times, transfer from an auxiliary unit to the computer is through the B register of the computer.

During block transfer operations to an auxiliary unit in response to an instruction CTB, sector comparison for the disc memory is effectively accomplished in the computer flip-flop S*o* by the existing comparison logic which is as follows:

$$1so=Kc'Do'N1T41'(Z1S1'+Z1'S1)$$
$$0so=T41$$

During block transfer operations from an auxiliary unit in response to a CFB operation, a primary gate WS controls sector comparison according to the existing logic in the computer which is as follows:

$$1so=\underline{Ws}(\underline{T8}+\underline{T28})(Z1s1+Z1'S1')$$

During block transfer operations to or from the computer, the sector code in the address register Xs6 to Xs1 illustrated in FIG. 10 initially represents the memory location from which the first word of a block of memory locations is to be read from or stored into. That sector code is incremented once during each computer word time so that the sector code address in that register follows the sector address of the computer. In that manner, the block transfer operation continues automatically until the sector octal code 77 is detected in the address register of auxiliary unit 11 by an AND gate which transmits a signal $\underline{Xs6\text{–}1}/1$ which is then employed in the computer to set the mode control flip-flop KC and thereby terminate the execution mode of the computer. The gate for this is:

$$1kc=\underline{Xs6\text{–}1}/{}^{1}\underline{HoBtT21}$$

An existing gate for terminating the operation of the computer after a loop transfer instruction is modified to restrict the operation of that gate to instructions having the operation codes 40 and 44. The modified gate is as follows:

$$1kc=S1'\underline{Vi}Do\underline{T40}D5'$$

The logic for the A register illustrated in FIG. 6 is modified to prevent the loss of data stored therein during buffer transfer operations. The logic for these modified gates is as follows:

$$1L41=Mr\underline{M6}D3'D1'D5'$$
$$0L41=Mr'\underline{M6}D3'D1'D5'$$

*Information transfer between a computer and an auxiliary unit*

As noted hereinbefore, information can be transferred between any computer and any auxiliary unit one word at a time and between any computer and its associated auxiliary unit in blocks. There are two major registers employed in a transfer operation. They are called the input-output register consisting of eight flip-flops X1 to X8 and the address register consisting of flip-flops Xs1 to Xs6 as shown in FIG. 11. The input-output register receives data from the computer in series and transfers it into the auxiliary unit core memory in parallel eight bits at a time. For transfer operations from the auxiliary unit to the computer, the input-output register functions in a reverse manner by receiving the information from the auxiliary unit in parallel, eight bits at a time, and transmitting it to the computer in series.

The address register Xs6–Xs1 is employed to address the memory location in the auxiliary unit into or out of which data is to be transferred. Since the computer word is 40 bits and the auxiliary unit receives and transmits data eight bits at a time, a memory location in the auxiliary unit must be defined for the purposes of communicating with the computer as comprising five characters of eight bits each. Accordingly, an address counter is employed to switch the read and write logic for the core memory in the auxiliary unit to five groups of eight cores in sequence, all five groups having the same address.

Figure 3:
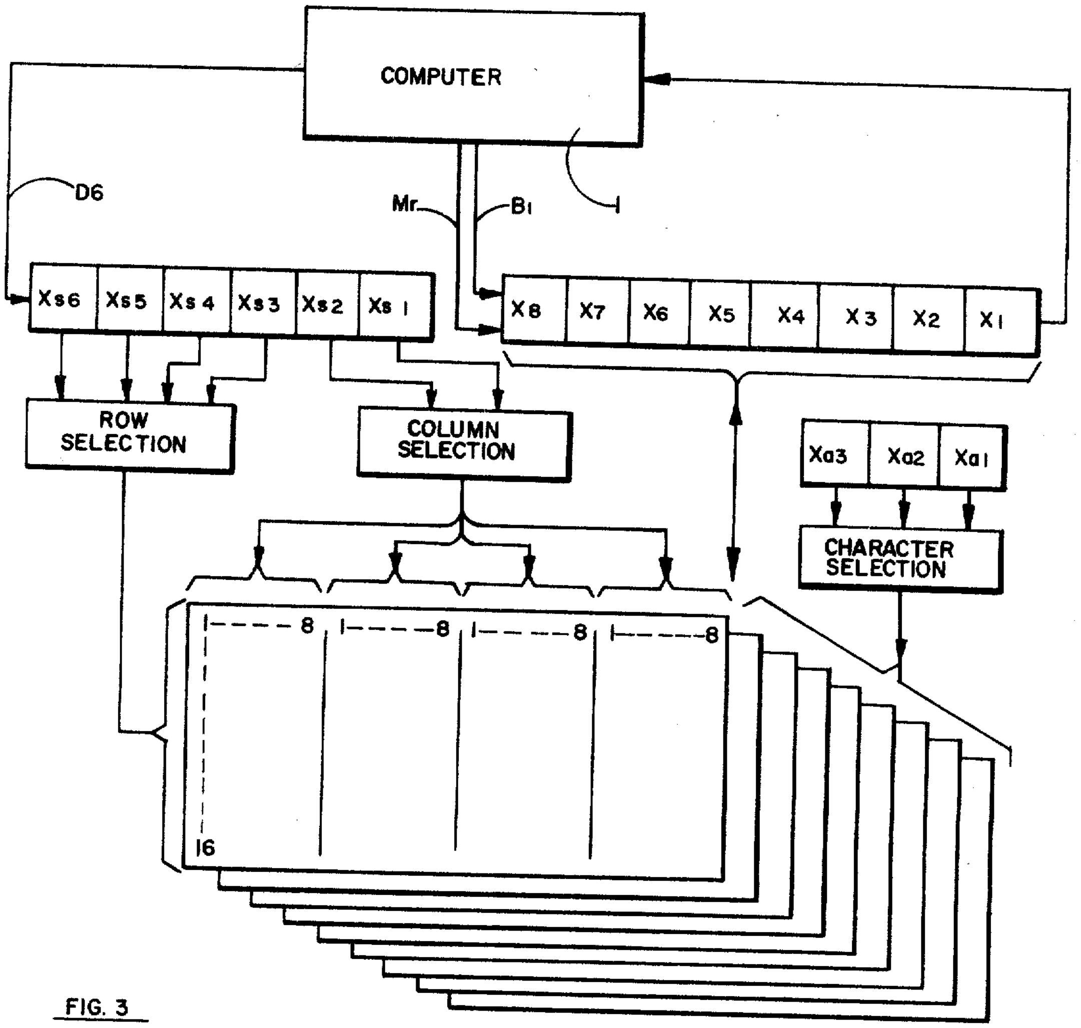
FIG. 3 is a functional diagram of a control network for a computer to address the memory of an auxiliary unit.

FIG. 3 illustrates the organization of an auxiliary unit core memory and the manner in which it is addressed. As noted hereinbefore, the address register receives the sector code from the computer via a flip-flop D6. The two least significant bits Xs2, Xs1 of the sector code are employed to select one of four columns of memory locations and the four most significant bits Xs6–Xs3 are employed to select the row of the memory location specified. If a word in the core memory consisted of the same number of bits as a word in the computer memory, the address register and the input-output register would suffice. However, since the core memory word is only eight bits, five groups of eight bits or characters are necessary to compose a computer word. Accordingly, for every row and column specified by the address register there is provided eight memory locations which are selected in sequence by the character counter Xa3Xa2Xa1. The eight character locations for each memory location specified by the address register Xs6–Xs1 are schematically illustrated as being on separate core planes which are successively coupled to the input-output register X8–81 by the character counter Xa3Xa2Xa1.

Referring again to FIG. 11, the logic network provided to control communication between computer 1 and the auxiliary unit 11 is shown. Read and write flip-flops Xr and Xw control reading out and writing into the core memory of the auxiliary unit. A flip-flop Xrw is used to increment the character counter Xa3Xa2Xa1 while reading into or writing out of the core memory. A flip-flop Xsc controls the sector address register during block transfer operations in response to CTB and CFB instructions. As explained hereinbefore, the starting address for a block transfer operation is shifted into the address register from the computer via the flip-flop D6 of the D register. After each word consisting of five characters, eight bits per character, the address register is incremented by one so that the next word in sequence may be transferred between the computer and the auxiliary unit until an AND gate Xs6–1 connected thereto detects the octal code 77 by the presence of a binary 1 in each flip-flop Xs1 to Xs6. When that condition is detected, a signal $\underline{Xs6\text{–}1}/1$ is transmitted to the gate defined by the aforementioned equation 1kc=Xs6–1/1 HoBtT21 to set the mode control flip-flop Kc in the computer, and thereby terminate execution of the block transfer instruction.

A flip-flop Xst controls the serial transfer of the sector address into the address register from the flip-flop D6 in the computer and resets the character counter when a new sector code is transferred into the address register in response to a new instruction. A character timing control flip-flop Xt transmits five timing signals for reading a word from the core memory, character by character. Those timing signals occur at computer times T1, T9, T17, T25 and T33. The control flip-flop Xt is similarly employed to generate five timing signals required for storing a word in the core memory, character by character. The writing signals occur at computer times T9, T17, T25, T33 and T41.

The logic networks which control transfer operations through the flip-flops X8–X1 just described will now be described in detail. As noted hereinbefore, a core read cycle is initiated in advance of the time that the first character of the word being read is to be transmitted serially to the computer. To accomplish that the read flip-flop Xr is turned on at time T38 of the preceding word time in accordance with the following equation:

$$1xr=\underline{T38Do'I1}/{}^{1}Xb11+\underline{T38Do'I1}/{}^{2}\mathrm{Xb21}$$
$$+\underline{T38Do'I1}/{}^{3}\mathrm{Xb}$$
$$0xr=Xr$$

The core read pulse is then generated at the next computer time T39 by a primary gate Crp shown in FIG. 11 according to the function Crp=XrCxp1.

Each time a read or write cycle is initiated in the auxiliary unit, the character counter Xa3Xa2Xa1 is incremented. The counter is initially set to 000 via an OR gate Xst+XwXrw not only by the flip-flop Xst prior to the read cycle as described hereinbefore, but also at the beginning of a write cycle by the flip-flops Xw and Xrw through a primary AND gate XwXrw when they are both set. The reset and counting logic of the character counter is as follows:

$$1xa1=Xa3'Xac$$
$$0xa1=Xa3Xac+Xst+XwXrw$$
$$1xa2=Xa3'XalXac$$
$$Oxa2=Xa2Xal'Xac+Xst+XwXrw$$
$$1xa3=Xa3'Xa2Xac$$
$$Oxa3=Xa3Xal'Xac+Xst+XwXrw$$

A count control flip-flop $Xac$ is provided to enable the character counter to function for either a read or write opreation according to the following logic:

$$1xac = Xr + XwXac'Xrw'$$
$$0xac = Xac$$

Setting the count control flip-flop $Xac$ is inhibited during a core write operation by the signals $Xac'$ and $Xrw'$ until after the first character writing time T9 because during a read operation, a character is read at time T1 and the character counter is incremented at time T2. However, during a write operation, the first character of a word is not stored in the core memory of the auxiliary unit time T9 so that it is necessary to inhibit incrementing the character counter until after T9. In other words, the flip-flop $Xrw$ is always turned on at time T39 prior to the word time of execution due to the need for reading early the first character for a transfer from the auxiliary unit to the computer, but since the flip-flop $Xw$ is not set until the next time T2, the flip-flop $Xrw$ is not off at time T2 and consequently the character counter is not incremented until the first character has been serially transferred into the input-output register X1 to X8 and stored in the core memory unit.

For block transfer operations, the address register $Xs6$–$Xs1$ is normally incremented at time $T_2$ according to the following logic:

$$1xs6 = Xsc\underline{Xs5\text{-}1}Xs6'$$
$$0xs6 = Xsc\underline{Xs5\text{-}1}Xs6$$
$$1xs5 = \underline{Xs4\text{-}1}Xs5'$$
$$0xs5 = \underline{Xs4\text{-}1}Xs5$$
$$1xs4 = \underline{Xs3\text{-}1}Xs4'$$
$$0xs4 = \underline{Xs3\text{-}1}Xs4$$
$$1xs3 = \underline{Xs2\text{-}1}Xs3'$$
$$0xs3 = \underline{Xs2\text{-}1}Xs3$$
$$1xs2 = \underline{Xs1c}Xs2'$$
$$0xs2 = \underline{Xs1c}Xs2$$
$$1xs1 = XscXs1'$$
$$0xs1 = XscXs1$$
$$\underline{Xs5\text{-}1} = Xs5Xs4Xs3Xs2Xs1$$
$$\underline{Xs4\text{-}1} = XscXs4Xs3Xs2Xs1$$
$$\underline{Xs3\text{-}1} = XscXs3Xs2Xs1$$
$$\underline{Xs2\text{-}1} = XscXs2Xs1$$
$$\underline{Xs1c} = XscXs1$$

The signal $Xrw'$ from the flip-flop $Xrw$ inhibits incrementing the sector address in the address register since the flip-flop $Xrw$ is set at time T39 and the flip-flop $Xw$ is not set until time T2 so that the flip-flop $Xrw$ is not reset at time T2; after time T2 the flip-flop $Xrw$ remains reset. The signal $Xrw'$ is also employed in the control logic for the flip-flop X1 of the input-output register.

Although signals T1 and T41 are not both used for reading and writing, the timing signals T9, T17, T25 and T33 are; accordingly, a single timing control flip-flop $Xt$ is provided for all timing signals including T1 and T41 according to the following:

$$1xt = /P6'P5P4'P3P2 + P6P5'P4'P3 + \underline{T40}^1Xb11 + /P6'P5P4'P3P2 + P6P5'P4'P3 + \underline{T40}^2Xb21 + /P6'P5P4'P3P2 + P6P5'P4'P3 + \underline{T40}^3Xb31$$
$$0xt = Xt/T41'/^1Xb11 + Xt/T41'/^2Xb21 + Xt/T41'/^3Xb31$$

It will be noted that the timing signals T41 and T1 are actually generated by setting the timing flip-flop $Xt$ at time T40 and resetting it at time T1. At all other times, the timing flip-flop $Xt$ is reset at the next bit time following its being set.

From the table of FIG. 10 which defines the operation of the P counter in the computer, it may be seen that the gate defined by P6P5P4'P3P2 in the foregoing equations specifies the bit timing periods 8 and 16 to enable the flip-flop $Xt$ to be set during the bit times immediately following, namely T9 and T17. Similarly, the gate P6P5'P4'P3 uniquely define the timing periods T24 and T32. The timing signals T40 and T1 are derived in the manner indicated in the table.

Whenever an instruction is to be executed which involves a transfer of data from the computer to the auxiliary unit, the data is transferred serially into the input-output register X8–X1 (FIG. 11) according to the following shift control logic:

$$1x8 = /Mr\underline{HoBt}/^1 + /B1D1/^1Xb11 + /B1/^2Xb21 + /B1/^3Xb31$$
$$0x8 = /Mr'\underline{HoBt}/^1 + /B1'D1/^1Xb11 + /B1'/^2Xb21 + /B1'/^3Xb31$$
$$1x7 = X8X4' \qquad 1x6 = X7X4' \qquad 1x5 = X6Xr'$$
$$0x7 = X8'Xr' \qquad 0x6 = X7'Xr' \qquad 0x5 = X6'Xr'$$
$$1x4 = X5Xr' \qquad 1x3 = X4Xr' \qquad 1x2 = X3Xr'$$
$$0x4 = X5'Xr' \qquad 0x3 = X4'Xr' \qquad 0x2 = X3'Xr'$$
$$1x1 = X2Xrw'$$
$$0x1 = X2'Xrw'$$

Where $\underline{Ho} = I1'DoI3a'$

The control logic for the flip1flop X1 provides for shifting into it the signal from the flip-flop X2 under the control of the signal $Xrw'$ in order to accommodate the last for each character or group of eight binary digits during a core writing operation.

During a core reading operation, the least significant bit of each character is transferred into the flip-flop X1 by the following logic:

$$1x1 = \underline{Co1x}/\underline{Bt}D3I1'/^1 + \underline{Co1x}/I1/^1Xb11 + \underline{Co1x}/I1/^2Xb21 + \underline{Co1x}/I1^3Xb31$$
$$0x1 = + \underline{Co1x'}/\underline{Bt}D3I1'/^1 + \underline{Co1x'}/I1/^1Xb11 + \underline{Co1x'}/I1/^2Xb21 + \underline{Co1x'}/I1/^3Xb31$$
$$\underline{Co1x} = Co1Xt$$
$$\underline{Co1x'} = Co1'Xt$$

It should be noted that the flip-flop X1 is the output flip-flop for the serial transfer of data from the auxiliary unit to the computer.

The remaining bits of a character are transferred in parallel from the core memory unit while reading according to the following logic:

$$1x7 = Co8Xr \qquad 1x6 = Co7Xr \qquad 1x5 = Co6Xr$$
$$0x7 = Co8'Xr \qquad 0x6 = Co7'Xr \qquad 0x5 = Co6'Xr$$
$$1x4 = Co5Xr \qquad 1x3 = Co4Xr \qquad 1x2 = Co3Xr$$
$$0x4 = Co5'Xr \qquad 0x3 = Co4'Xr \qquad 0x2 = Co3'Xr$$
$$1x1 = Co2Xr$$
$$0x1 = Co2'Xr$$

Since the read control flip-flop $Xr$ is set for only one bit time for the purpose of generating a single read pulse $Crp$, after a character has been read from the core memory in the auxiliary unit into the input-output register, shifting of the character from the input-output register to the computer via flip-flop B41 is provided by the terms of the foregoing shift control equations of the input-output register except the flip-flop X1. The shift control for that flip-flop is as follows:

$$1x1 = X2Xr'Xt'$$
$$0x1 = X2'Xr'Xt'$$

In block transfer operations represented by the primary gate $\underline{Bt}$ (FIG. 8) information is transferred either from the computer or from the core memory of the auxiliary unit starting at a particular section address. The read and write control flip-flops $Xr$ and $Xw$ are set for the respective block transfer operations in accordance with the following equations:

$$1xr = Xt/\underline{Bt}D3\underline{Ho}T41'/^1$$
$$0xr = Xr$$
$$1xw = Xt/\underline{Bt}D3'\underline{Ho}T1'/^1$$
$$0xw = Xw$$

Since the block transfer operation designated by the primary gate $\underline{Bt}$ does not specify whether the transfer is from the computer or the auxiliary unit, a term D3 is included to set the read control flip-flop $Xr$ and the term D3' is included to set the flip-flop $Xw$ since, as may be noted from FIG. 5, the two types of block transfer operations are distinguished by the bit position D3 of the operation code in the D register illustrated in FIG. 9. The control flip-flops X*r* and X*w* are immediately reset by the next clock pulse.

For operand reading from the auxiliary unit, both mode control flip-flops I1 and D*o* are on after the associated flip-flop X*b*1, X*b*2 or X*b*3 has been set. The read control flip-flop X*r* is then set by the following logic:

$$1xr=Xt/DoI1T41'/^{1}Xb11+Xt/DoI1T41'/^{2}Xb21+Xt/DoI1T41'/^{3}Xb31$$

$$0xr=Xr$$

Reading is then accomplished as for block transfer operation except that only one word is transferred to the computer addressing the auxiliary unit 11. Operand reading is terminated by the normal mode control which resets the flip-flops I1 and D*o* to initiate the execute mode of operation.

*Sector count control*

During block transfer operations, it is necessary to increment the sector code in the address register X*s*6–X*s*1 shown in FIG. 11 once for each 40-bit word transferred. In the case of a transfer from the auxiliary unit 11 in response to an instruction CFB indicated by the term D3 in its operation code, the sector code is incremented at time T32 determined by a gate P6P5'P4P3P2 associated with the P counter. Accordingly, at the time the last character of a word is read from a core memory location, the other four characters having been read at times T1, T9, T17 and T25, the sector count control flip-flop X*sc* is turned on for one bit time period by the following logic:

$$1xsc=/\underline{Ho}D3P6P5'P4'P3P2/^{1}Xb11$$
$$0xsc=Xsc$$

The primary gate signal $\underline{Bt}$ is not necessary in that control logic since it is inferred by the primary gate signal $\underline{Ho}$ and the signal from the priority control flip-flop X*b*11. It should be noted that $\underline{Ho}$ is a control signal developed by the computer for the execution of a transfer instruction requiring more than one more word time as specified by binary digits D5'D4 of its operation code.

During a block transfer operation from the computer to its associated auxiliary unit, which is identified by D3' in the operation code, the sector count is incremented at time T2 following the first word time of operation. Accordingly, the first word is transferred into a core memory location, character by character, at times T9, T17, T25, T33 and T44, after which the sector address is incremented at time T2 before storing the first eight-bit character of the second word at time T9. As noted hereinbefore, sector count incrementation is inhibited during the first word time by the signal X*rw*' in the control logic for the flip-flop X*sc*.

Incrementation of the address register X*st*–X*s*1 is controlled during block transfer operations by the logic network described hereinbefore in column 17. That incrementation is according to the conventional binary code where the least significant binary bit of the count is stored in the X*s*1 register and the most significant binary bit of the count is stored in the X*s*6 register. The exact timing for each incrementation is through the flip-flop X*sc*. In order to inhibit incrementing the address register during the first word time through the use of the term X*rw*' as described hereinbefore, it is necessary to reset the flip-flop X*rw* before time T2 by setting the flip-flop X*w* at time T1 according to the following logic:

$$1xw=/\underline{Bt}D3'\underline{Ho}T1/^{1}Xrw$$

The write control flip-flop X*w* must also be turned on for one word transfer operations from any of the three computers. This control is provided by the following logic:

$$1xw=/\underline{M}6D1/^{1}XtXb11+/\underline{M}6/^{2}XtXb21+/\underline{M}6/^{3}XtXb31$$

where $\underline{M6}$ is a primary gate in the back of the respective computers for mode control I2'I1'D*o*D4'D2'.

Once the write control flip-flop X*w* is turned on, actual storing of the contents of the input-output register X1, to X8, is controlled by the next clock pulse received from the computer according to the following logic:

$$Cwp=XwCxp1$$

The information in the input-output register is then transferred to the location specified by the address register and character counter through eight separate flip-flops C*o*8–C*o*1 within the core memory which receive pulses representing the information contained in the eight flip-flops X1 to X8 of the input-output register. Thus, a word is transferred into a core memory location from the input-output register X8–X1 eight bits at a time in response to write control pulses C*wp* which are produced under the control of the write control flip-flop X*w*. It should be noted that a word is read out of memory through the flip-flops C*o*8–C*o*1 in response to read control pulses C*rp* which are produced under the control of the read control flip-flop X*r*.

The foregoing description relates primarily to the computer 1 and its associated auxiliary unit 11. Since the remaining computers 2 and 3, and their associated auxiliary units are similar, it is not necessary to describe them in detail. However, to illustrate how one other computer and its associated auxiliary unit is connected in the system, the auxiliary unit 12 and its associated computer 2 will be briefly described. Because of the similarity, that brief description may also serve as a brief summary of the detailed description of computer 1 and its associated auxiliary unit 11.

*Auxiliary unit 12 logic*

As in the auxiliary unit 11, three priority control flip-flops are employed. These are flip-flops X*b*12, X*b*22, and X*b*32. One of these flip-flops is turned on for the condition $\underline{Xb02}=1$, where $\underline{Xb02}=Xb12'Xb22'Xb32$.

According to the priority scheme mentioned above with reference to FIG. 2, the priority control flip-flops are set according to the following logic:

$$1xb12=/T2/^{1}Ca12Ca22'\underline{Xb02}$$
$$0xb12=Ca12'+Xb22$$
$$1xb22=/T2/^{2}Ca22\underline{Xb02}$$
$$0xb22=Ca22'$$
$$1xb32=/T2/^{3}Ca32Ca22'Ca12'\underline{Xb02}$$
$$0xb32=Ca32'+Xb22+Xb12$$

As in the case of auxiliary unit 11, only one of the three priority control flip-flops can be turned on. The logic for flip-flop X*b*22 is similar to that previously considered for X*b*11 since this is the top priority control flip-flop for unit 12. The second priority goes to control flip-flop X*b*12, and this logic is similar to the logic for X*b*21 previously considered. Finally, the logic for flip-flop X*b*32, which is the lowest priority control flip-flop, is similar to that previously considered for X*b*31.

As previously noted, the priority control flip-flops are clocked from individual clocks from the respective computers. Thus, X*b*12 receives C*p*1, X*b*22 receives C*p*2, and flip-flop X*b*32 receives C*p*3. The termination logic functions in the same manner as that previously considered for auxiliary unit 11. The access-acknowledging control for computer 2 to auxiliary units is developed in flip-flop X*b*2 according to the following:

$$1xb2=Xb21+Xb22+Xb23$$
$$0xb2=Xb21'Xb22'Xb23'$$

The complex clock developed for auxiliary unit 12 may be defined as follows:

$$Cxp2=Cp1Xb12Xb22'Xb32'+Cp2Xb22Xb12'Xb32'+Cp3Xb32Xb12'Xb22'$$

The function of this logic is substantially identical to that previously considered for the complex clock $Cxp1$ for the auxiliary unit 11.

After access is obtained to auxiliary unit 12, the computer addressing the unit transmits a signal $\underline{St}$ where $\underline{St}=N1I1Do'Kc'$.

The sector code reading and shifting through flip-flops Xs6–1 for auxiliary unit 12 may be expressed as follows:

$$1xst=/\underline{St}/^1Xb12+/\underline{St}/^2Xb22+/\underline{St}/^3Xb32$$
$$0xst=/\overline{N1'}/^1Xb12+/N1'/^2Xb22+/N1'^3Xb32$$
$$1xs6=/D6/^1XstXb12+/D6/^2XstXb22+/D6/^3XstXb32$$
$$0xs6=/D6'/^1XstXb12+/D6'/^2XstXb22+/D6'/^3XstXb32$$
$$1xs5=Xs6Xst$$
$$0xs5=Xs6'Xst$$
$$1xs4=Xs5Xst \qquad 1xs3=Xs4Xst$$
$$0xs4=Xs5'Xst \qquad 0xs3=Xs4'Xst$$
$$1xs2=Xs3Xst \qquad 1xs1=Xs2Xst$$
$$0xs2=Xs3'Xst \qquad 0xs1=Xs2'Xst$$

The advance core read cycle for auxiliary unit 12 is initiated by the following logic:

$$1xr=/\underline{T38}Do'I1/^1Xb12+/\underline{T38}Do'I1/^2Xb22+/\underline{T38}Do'I1/^3Xb32$$

Each core read cycle is timed by pulse $Crp2$, defined by the following:

$$Crp2=XrCxp2$$

The logic for the character counter $Xa3Xa2Xa1$ of the auxiliary unit is identical to that previously considered for the auxiliary unit 11.

The logic for flip-flop $Xt$ is similar for auxiliary unit 12 with the appropriate substitution for the priority control flip-flops. The new logic appears as follows:

$$1xt=/P6'P5P4'P3P2+P6P5'P4'P3+\underline{T40}/^1Xb12+/P6'P5P4'P3P2+P6P5'P4'P3+\underline{T40}/^2Xb22+/P6'P5P4'P3P2+P6P5'P4'P3+\underline{T40}/^3Xb32$$
$$0xt=Xt/T41'/^1Xb12+Xt/T41'/^2Xb22+Xt/T41'/^3Xb32$$

Read and write control for a transfer operation in the auxiliary unit 12 is similar to that considered for auxiliary unit 11 and may be expressed as follows:

$$1xr=Xt/\underline{Bt}D3\underline{Ho}T41'/^2$$
$$0xr=Xr$$
$$1xw=Xt/\underline{Bt}D3'\underline{Ho}T1'/^2$$
$$0xw=Xw$$

The incrementation of the address register $Xs6$–$Xs1$ is controlled by flip-flop $Xsc$ in the auxiliary unit by the logic:

$$1xsc=/HoD3P6P5'P4'P3P2/^2Xb22$$
$$0xsc=Xsc$$

Address register incrementation is inhibited during the first word time of a block transfer operation by signal $Xrw'$, developed in the auxiliary unit 11 from the logic:

$$1xrw=Xr$$
$$0xrw=Xw$$

The address register incrementation logic for block transfer instruction CTB may then be expressed as follows:

$$1xsc=/\underline{Ho}D3'T2/^2Xb22Xrw'$$
$$0xsc=Xsc$$

The remaining address register control logic is similar to that in the auxiliary unit 11.

When operand reading from the auxiliary unit 12 is required, the control logic for the flip-flop Xr is set up for auxiliary unit 12 in the same manner as for auxiliary unit 11. The new logic appears as follows:

$$1xr=Xt/DoI1T41'/^1Xb12+Xt/DoI1T41'/^2Xb22+Xt/DoI1T41'/^3Xb32$$
$$0xr=Xr$$

The serial transfer from the computers is similar to that previously considered for the auxiliary unit 11. The new logic is as follows:

$$1x8=/Mr\underline{HoBt}/^2+/B1/^1Xb12+/B1D1/^2Xb22+/B1/^3Xb32$$
$$0x8=/Mr\underline{HoBt}/^2+/B1'/^1Xb12+/B1'D1/^2Xb22+/B1'/^3Xb32$$

where $\underline{Ho}=I1'DoI3a'$.

The shifting logic through flip-flop X7–X1 is similar to that previously considered for auxiliary unit 11 and will therefore not be repeated here.

During a reading operation in auxiliary unit 12, the least significant bit of each character is entered into flip-flop X1 according to the following logic, which is similar to that considered for auxiliary unit 11:

$$1x1=\underline{Co1x}/\underline{Bt}D3I1'/^2+\underline{Co1x}/I1/^1Xb12+\underline{Co1r}/I1/^2Xb22+\underline{Co1r}/I1/^3Xb32$$
$$0x1=\underline{Co1x'}/\underline{Bt}D3I1'/^2+\underline{Co1x'}/I1/^1Xb12+\underline{Co1x'}/I1/^2Xb22+\underline{Co1x'}/I1/^3Xb32$$

where:

$$\underline{Co1x}=Co1Xt$$
$$\underline{Co1x'}=Co1'Xt$$

The serial transfer of bits 2 through 8 of each character is effected in the same manner as in the auxiliary unit 11 and therefore is not repeated here.

The additional read shift gate required for the flip-flop X1 is similar to that in the auxiliary unit 11, namely $1x1=X2Xr'Xt$; $0x1=X2'Xr'Xt'$.

Flip-flop $Xw$ is controlled for the one word store and block transfer instructions, according to the following logic which is similar to that of auxiliary unit 11:

$$1xw=/M6/^1XtXb12+/M6D1/^2XtXb22+/M6/^3XtXb32+/\underline{Bt}D3'HoT1/^2Xrw$$

After the flip-flop $Xw$ is set, core writing is controlled by write pulse Cwp2, defined by:

$$Cwp2=XwCxp2$$

The information previously entered in flip-flops X8–1 is transferred to the core by the pulse gates, defined as follows:

$$Ci8\text{–}1=X8\text{–}1.Xw.Cxp2$$

The logic for computer 2 is similar to that of computer 1. The following signals are generated in computer 2 in the same manner as corresponding signals generated in computer 1.

B1—The B register least significant bit position at time T1.

B41—The B register sign bit position at time T1, and is modified to prevent reading of the computer main memory flip-flop ($Mr$ during core access period and to receive signals $$/X1/^1,\ /X1/^2,\ /X1/^3$$

from auxiliary units 11, 12 and 13, respectively.

$\underline{Bt}$—The buffer transfer control signal generated for the associated auxiliary unit 12 by decoding the operation codes of block transfer instructions CTB and CFB.

O6 to C1—The computer channel code flip-flops C6–C1 which are connected into a shift register with flip-flops D6–D1 and are analyzed to detect an auxiliary unit address octal 74, 75 or 76.

$\underline{Ca2'}$—The signal defined as the "and" function of the reset conditions of the three flip-flops $Ca21$, $Ca22$ and $Ca23$ to indicate that no access to an auxiliary unit has been requested, where:

$$Ca2'=Ca21'Ca22'Ca23'$$

$Ca21$, $Ca22$, $Ca23$—Three flip-flops which indicate requests for access to auxiliary units 11, 12 and 13, respectively.

$\underline{Cb}$—A primary gate signal which identifies channel addresses 74, 75, and 76 where:

$$\underline{Cb}=C6C5C4C3KcTr1$$

D1 to D6—Six flip-flops D1–D6 which store the operation code. Flip-flop D6 also receives the sector and channel bits as they are serially shifted and, therefore, is coupled to the address register Xs6–Xs1 of the auxiliary unit to which the computer 2 has gained access.

D*o*—The flip-flop which identifies those periods of time that information is to be stored in the computer, or in an auxiliary unit, or to be read from the computer memory or from an auxiliary unit. Flip-flop D*o* also has other mode control implications the same as pointed out with reference to computer 1 where they are applicable.

$\underline{Ho}$—A mode control signal best explained by its definition which is I1′ DoI3*a*′ for the execution of instructions as described in the aforementioned copending application.

I2—A mode control signal which distinguishes between I*c* and I*n* when I1 is present. I2 is not present during I*c* and is during I*n*; it also distinguishes between the first word of execution during which time I2 is present and the subsequent words of operation identified by another signal, during which time I2 is not present.

$\underline{I3}$—A primary gate signal which controls execution during the time flip-flop I3*a* is reset (indicating that the execution is not an arithmetic one when flip-flop D2 is set), where:

$$\underline{I3}=I4'I1'Do'I3a'$$

I3*a*—A flip-flop which is turned on for all arithmetic operations which are identified by the presence of a D2 signal in the operation code.

I4—A flip-flop which is reset during all operations except input and output operations.

$\underline{Ic}$—An instruction search mode control signal where:

$$\underline{Ic}=I4'I2'I1$$

$\underline{In}$ A number search mode control signal where:

$$\underline{In}=I4'I2I1$$

$\underline{Io}$ Output mode control signal where:

$$\underline{Io}=I4I2I1'$$

$\underline{It1}$ A primary mode control signal which is used in the control of the flip-flops C*a*21, C*a*22 and C*a*23 where:

$$\underline{It1}=I1Do'T1$$

$\underline{K41}$ A timing signal equal to K*c*T41

$\underline{Kc}$ A flip-flop for mode control, particularly a timing signal equal to K*c*′T41

S*o* A flip-flop which provides sector comparison for disc access and provides an interlock to cut out disc memory reading or writing at times when auxiliary unit core reading or writing is to take place. If flip-flop S*o* is set, it has the effect of preventing flip-flop D*o* from being set by the normal search logic which is effective during disc memory access.

Z41 A flip-flop for the Z register (a recirculating loop) which stores an instruction.

*Zb* A primary gate signal used to time the sampling of the channel code being transferred into the Z register via the flip-flop Z41 in order to determine whether access to an auxiliary unit is required.

*Computer 2 logic*

The signals which are uniquely associated with computer 2, but which but which correspond to similar signals associated with computer 1, will now be described. The first is C*a*2′, which corresponds to C*a*2′ associated with computer 1.

$$Ca2'=Ca21'Ca22'Ca23'$$

where C*a*21, C*a*22 and C*a*23 are signals from flip-flops shown in FIG. 2 which indicate requests from computer 2 for access to auxiliary units 11, 12 and 13.

The logic network for resetting flip-flop I1 is inhibited by the signal C*a*2′, which indicates that the computer has not made a request for access to any auxiliary unit and, accordingly, may continue in the $\underline{In}$ mode of operation of number search. The gate with this inhibiting function appears as follows:

$$Oi1=\underline{In}D5'\underline{Ko}Ca2'$$

In the event a request for auxiliary unit access has been made, flip-flop I1 will not be turned off because of the inhibiting action of C*a*2′ and, accordingly, two other gates are added to cover the buffer transfer execution which may follow or the core read or write execution which may follow. These gates are:

$$Oi1=\underline{In}\underline{Ko}\underline{Bt}Xb2+\underline{In}D5'\underline{Ko}Xb2$$

Flip-flop X*b*2, as previously noted with reference to FIG. 2, indicates that access to an auxiliary unit has been obtained by computer 2 as follows:

$$1xb2=Xb21+Xb22+Xb23$$

If computer 2 detects a channel address octal 74, 75, or 76, the mode of operation remains in I1K*c*′ until the appropriate flip-flop X*b*21, X*b*22 or X*b*23 is set. In the case of auxiliary unit 11 being addressed by computer 1, flip-flop X*b*21 is set by logic previously discussed after flip-flop C*a*21 has been set. This, then, causes flip-flop X*b*2 to be set, and mode control flip-flop I1 is then set by the gate including the signal $\underline{Bt}$ for buffer transfer operations or the gate including D5′ for operations which do not require reading out of an auxiliary unit.

In the case where access to an auxiliary unit is obtained and an instruction or a number is to be read therefrom, flip-flop I1 remains on and flip-flop D*o* is turned on by the following gate: $1do=I1\underline{Ko}Do'Xb2$ It is necessary to prevent the mode control flip-flop D*o* from being set by the normal search logic for the computer disc memory after a request for access to an auxiliary unit has been made. Theerfore, C*a*2′ is added to the gate for setting the flip-flop D*o* as follows:

$$1do=So'\underline{Ko}I4'I1Do'Ca2'$$

During instructions which involve a transfer from an auxiliary unit to the computer 2, its flip-flop D*o* must be set to permit transfer to the B register in the case of a single word transfer or to the memory write flip-flops M*w*1 and M*w*2 for a block transfer. The gate for this control is the following:

$$1do=\underline{Ws}\underline{Ko}Xb2$$

where: $Ws=I4'I1'D4'D3D2'Do'$.

The logic for the flip-flop B41 of the B register is as follows:

$$B41=/X1/^{1}DoXb21+/X1/^{2}DoXb22+/X1/^{3}DoXb23$$

The signals $/X1/^{1}$, $/X1/^{2}$ and $/X1/^{3}$ come respectively from auxiliary units 11, 12 and 13 under control of flip-flops X*b*21, X*b*22, and X*b*23. Two of the existing gates on flip-flop B41 are modified indirectly to inhibit the existing logic from operating while reading from an auxiliary unit. Thus normal memory read gates connected to the flip-flop B41, which are M*r*DoK*a*′S*o*′ and M*r*′DoK*a*′S*o*′, are inhibited by setting flip-flop S*o* with the following:

$$1so=\underline{In}Kc'\underline{Bt}T1+I1Xb2T41'$$
$$0so=\underline{T41}$$

The existing gates for flip-flops M*w*1 and M*w*2 are similarly modified by changing the definition of the primary signal $\underline{Mtm}$. The new primary is:

$$\underline{Mtm}=Ka'D3D1Xb2'$$

The change prevents this primary signal $\underline{Mtm}$ from being effective while reading from an auxiliary unit for a block transfer operation. The gates which are effective during core reading are $$1mw1=/X1/^{2}\underline{Bt}D3\underline{Ho}$$
$$0mw1=/X1'/^{2}\underline{Bt}D3\underline{Ho}I2'T1'$$
$$1mw2=/X1'/^{2}\underline{Bt}D3\underline{Ho}$$
$$0mw1=/X1/^{2}\underline{Bt}D3\underline{Ho}I2'T1'$$

It will be noted that direct memory writing from an auxiliary unit is performed only during a block transfer (CFB) operation defined by the condition $\underline{Bt}D3\underline{Ho}$. All other transfers to the computer memory are through the B register.

It will be noted that no new gate is provided to turn flip-flop D*o* on for block transfer operations. The reason for this is that the normal disc search for loop transfer, for which logic is already present, must be accomplished before the block transfer can begin. That is, the beginning sector must be found on disc, this sector being specified by the instruction. The present gate for this is:

$$1do=So'\underline{Ui}D4'D2'Do'T41$$

During transfer operations to the auxiliary unit 12 for instruction CTB, when a D3′ signal is present, primary signal $\underline{Ws}$ is not effective, and the in-phase sector comparison is accomplished in flip-flop S*o* by the existing sector comparison logic, which is:

$$1so=Kc'Do'N1T41'(Z1S1'+Z1'S1)$$
$$0so=T41$$

During block transfer operations to the computer 2 (for CFB instructions) the primary signal $\underline{Ws}$ controls the most significant comparison bit according to the existing logic:

$$1so=\underline{Ws}(\underline{T8}+\underline{T28})(Z1S1+Z1'S1')$$

During the block transfers to or from the computer 2, the memory word location code in the auxiliary unit address register X*s*6–X*s*1 which corresponds to the initial sector on the disc to which, or from which, information is transferred, is incremented once each word time so that the auxiliary unit address follows the disc address. This operation is continued until sector code octal 77 is detected in the address register. That condition is used to set computer flip-flop Kc for termination. The gate for this is:

$$1kc=\underline{HoBtT21}/Xs6\text{–}1/^2$$

Where $\underline{Xs6\text{–}1/^2}$ is a primary gate signal indicating octal 77 has been detected in the address register of auxiliary unit 12, the existing termination gate for loop transfers is modified to restrict its operation to instructions having operation codes 40 and 44. The modified gate appears as follows:

$$1kc=S1'\underline{Ui}Do\underline{T40}D5'$$

The A register logic is modified to insure recirculation during block transfer operations. The appropriate logic for this is:

$$1a41=A1\underline{Bt}I3 \qquad 0s41=B1'I3D5D1'D4$$

The L loop write logic is modified to limit its operation to the loop function, the revised logic being:

$$L41=Mr\underline{M6}D3'D1'D5'$$

The next logic to be considered is the control for the flip-flops C*a*21, C*a*22 and C*a*23 which are associated with computer 2. This logic is operative during the first word of mode $\underline{Ic}$ or mode $\underline{In}$, which is identified by the signal K*c*. It will be helpful in considering this logic to refer back to the description pertaining to the corresponding control network for flip-flops C*a*11, C*a*12 and C*a*13 associated with computer 1 as set forth in columns 21 and 22.

$$1ca21=\underline{Cb}\underline{Ic}Xi2'+\underline{Cb}\underline{In}D5+\underline{Cb}\underline{In}D4'\underline{Mtm}+\underline{InB}=\underline{K41}+I41Xib$$
$$0ca21=\underline{Ic}DoT41+Ca22'\underline{It1}+Ca23'\underline{It1}+13a+I1'D4+I1'K41$$
$$1ca22=\underline{Zb}P4'+\underline{InBt}K41$$
$$0ca22=Ca23\underline{It1}+Ca21'It1+13a+I1'D4$$
$$1ca23=\underline{Zb}P2'$$
$$0ca23=Ca22\underline{It1}=Ca21'It1+13a+I1'D4+\underline{InBt}K41$$

Where:

$$I41=i2'$$
$$Xib=Xi2Xb2'$$
$$\underline{Mtm}=Ka'D3D1Xb2'$$
$$\underline{Cb}=C6C5C4C3KcT41$$
$$\underline{It1}=I1Do'T1$$
$$\underline{Zb}=Z41'I1KcN1P3'$$
$$1Z41=G1IcKcDo'$$
$$0Z41=G1'IcKcDo'$$

During the first word time of mode $\underline{Ic}$ or mode $\underline{In}$, the channel code pattern is analyzed through the operation of primary gate $\underline{Zb}$. Flip-flop C*a*22 is set for the condition $\underline{Zb}P4'$ which senses a zero in the channel bit position corresponding to flip-flop C2 of the C register in computer 2 and flip-flop C*a*23 is set by the function $\underline{Zb}P2'$ which senses a "zero" in the channel bit corresponding to flip-flop C1. If flip-flop C*a*22 is set, it means that there is a zero in bit position 2 of the channel code, whereas if flip-flop C*a*23 is set, it means there is a zero in bit position 1 of the channel code. At the end of the first word of mode $\underline{Ic}$ or mode, $\underline{In}$, signal $\underline{Cb}$ appears. If the four most significant channel bits are each equal to one, which covers octal codes 74, 75, 76, 77, flip-flop C*a*21 is set for three possible conditions: (1) when an instruction is addressed in one of the auxiliary units; (2) during mode $\underline{In}$ for instructions requiring an operand; and (3) for store instructions. Finally, the flip-flop C*a*21 is set during block transfer operations.

If flip-flop C*a*21 is not set for one of those conditions, it means that an auxiliary unit address cannot be present, and the other flip-flops C*a*22 and C*a*23 are reset.

If flip-flop C*a*22 is set, flip-flop C*a*23 is reset because it is not possible to have both octal codes 75 and 76, and the set condition of C*a*22 means that the channel bit C2 is zero, whereas in octal code 76 the channel bit C2 is one. In a similar manner, if flip-flop C*a*23 is set, it means that channel 76 may be specified and 75 is, therefore, not possible; therefore, flip-flop C*a*22 is reset. If both flip-flops C*a*22 and C*a*23 are set, it means that channel 74 may have been specified, and both flip-flops C*a*22 and C*a*23 reset. If neither flip-flop C*a*22 nor C*a*23 is set, it means that the first two channel bits C1 and C2 are both one and that channel 77 may have been specified. Accordingly, flip-flop C*a*21 is reset.

Flip-flops C*a*22 and C*a*23 are set and reset, respectively, for block transfer operations.

Termination of access to an auxiliary unit by computer 2 is the same as for computer 1, at the beginning of any arithmetic instruction as indicated by a signal I3*a* and at the beginning of any instruction having a signal D4 in the operation code. Once the flip-flop C*a*21 is reset, the remaining flip-flops C*a*22 and C*a*23 are also reset at the beginning of the next mode I*c*. C*a*21 is reset at the end of reading an instruction and at the end of executing an instruction.

The logic networks for the remaining computer 3 and its associated auxiliary unit 13 are similar to that just described briefly for computer 2 and its auxiliary unit, or to that described in detail for the computer 1 and auxiliary unit 11. Additional computers and auxiliary units may be added in a similar manner by simply expanding the matrix of the priority control logic schematically represented in FIG. 2. Once access to any auxiliary unit is granted to any computer, the transfer operations are as described for computer 1 and auxiliary unit 11.

While the principles of the invention have now been made clear, there will be immediately obvious to those skilled in the art many modifications in structure, arrangement, the logic networks, and components used in the illustrative embodiment of the invention, and otherwise, which are particularly adapted for specific applications and operating requirements, without departing from those principles. The appended claims are therefore intended to cover and embrace any such modifications, within only the true spirit and scope of the invention.

We claim:

1. A multiple computer system comprising
a plurality of stored program digital computers,
a corresponding plurality of auxiliary units, one associated with each computer, each unit having a random access memory,
an auxiliary unit access control for recognizing preselected addresses of a computer instruction as auxiliary unit addresses and for providing selection control signals in response to said recognized addresses, each of said signals uniquely identifying the computer selecting any one of the auxiliary units and the auxiliary unit which is being selected,
priority control means coupled to said access control means for controlling access to the memories of said auxiliary units in accordance with a predetermined order of priority, and
an access-acknowledging control means associated with each auxiliary unit for receiving auxiliary unit selection control signals related to the particular auxiliary unit and for providing control signals for connecting the selected auxiliary unit to the computer whose program addressed the unit means coupled to said access-acknowledging control means for developing a complex clock pulse for transmission to the selected auxiliary unit in synchronism with a clock pulse produced in the computer whose program addressed the unit, whereby the addressed auxiliary unit is caused to operate in synchronism with the addressing computer.

2. In a serial computer system having a recirculating-type memory where operands and instructions in said memory are addressed by channel and word address codes, each channel corresponding to a block of cyclicly acessible word locations in said memory, a device for modifying the addressing structure of said computer to permit the addition of a randomly accessible auxiliary memory unit, said device comprising
first means for sensing all address signals and for producing a first signal indicating addresses selected to represent the auxiliary memory,
second means for modifying the instruction and operand access control in said computer so that upon receipt of said first signal, no serial searching is performed, access being made directly to the corresponding address in the randomly accessible memory unit, and
third means for connecting the auxiliary memory unit to said computer for synchronous communication in response to said first signal.

3. In a computer system having at least one processor and at least one auxiliary unit,
means for sensing all address signals of an incoming address to a processor and for producing a selection control signal indicating addresses in said processor representing a selected auxiliary unit, and
means responsive to said selection control signal for modifying operation of the processor to inhibit processor memory serial searching and to access directly the corresponding auxiliary unit address.

References Cited

UNITED STATES PATENTS

| | | | |
|---|---|---|---|
| 3,061,192 | 9/1962 | Terzian | 235—157 |
| 3,158,844 | 11/1964 | Bowdle | 340—174.1 |
| 3,200,380 | 8/1965 | MacDonald | 340—172.5 |
| 3,242,467 | 3/1966 | Lamy | 340—172.5 |
| 3,247,488 | 4/1966 | Welsh | 340—172.5 |
| 3,251,040 | 5/1966 | Burkholder | 340—172.5 |

ROBERT C. BAILEY, *Primary Examiner.*

I. S. KAVRUKOV, *Assistant Examiner.*